US009544294B2

(12) United States Patent
Srinivasan et al.

(10) Patent No.: US 9,544,294 B2
(45) Date of Patent: Jan. 10, 2017

(54) PLUGGABLE AUTHORIZATION POLICIES

(71) Applicant: Oracle International Corporation, Redwood Shores, CA (US)

(72) Inventors: Uppili Srinivasan, Fremont, CA (US); Ajay Sondhi, San Jose, CA (US); Ching-Wen Chu, San Jose, CA (US); Shivaram Bhat, Sunnyvale, CA (US); Venkata S. Evani, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/266,515

(22) Filed: Apr. 30, 2014

(65) Prior Publication Data

US 2015/0089571 A1    Mar. 26, 2015

Related U.S. Application Data

(60) Provisional application No. 61/880,335, filed on Sep. 20, 2013.

(51) Int. Cl.
G06F 7/04 (2006.01)
H04L 29/06 (2006.01)

(52) U.S. Cl.
CPC .......... *H04L 63/0815* (2013.01); *H04L 63/08* (2013.01); *H04L 63/0807* (2013.01);
(Continued)

(58) Field of Classification Search
CPC ........ H04L 63/10; H04L 63/102; H04L 63/20; H04L 63/205; H04L 63/0807; H04L 63/0815; H04L 63/0853; H04L 63/08
See application file for complete search history.

(56) References Cited

U.S. PATENT DOCUMENTS 7,685,206 B1    3/2010 Mathew et al.
7,784,092 B2    8/2010 Pearson et al.
(Continued)

FOREIGN PATENT DOCUMENTS

EP    2257026 A1    12/2010
WO    2015/042349 A1    3/2015

OTHER PUBLICATIONS

Final Office Action for U.S. Appl. No. 13/464,880 (Aug. 29, 2014) 19 pages.
(Continued)

*Primary Examiner* — Shwaye Gelagay
*Assistant Examiner* — Khoi Le
(74) *Attorney, Agent, or Firm* — Kilpatrick Townsend & Stockton LLP

(57) ABSTRACT

A framework, which conforms to the OAuth standard, involves a generic OAuth authorization server that can be used by multiple resource servers in order to ensure that access to resources stored on those resource servers is limited to access to which the resource owner consents. Each resource server registers, with the OAuth authorization server, metadata for that resource server, indicating scopes that are recognized by the resource server. The OAuth authorization server refers to this metadata when requesting consent from a resource owner on behalf of a client application, so that the consent will be of an appropriate scope. The OAuth authorization server refers to this metadata when constructing an access token to provide to the client application for use in accessing the resources on the resource server. The OAuth authorization server uses this metadata to map issued access tokens to the scopes to which those access tokens grant access.

20 Claims, 19 Drawing Sheets

(52) U.S. Cl.
CPC .......... *H04L 63/0853* (2013.01); *H04L 63/10* (2013.01); *H04L 63/102* (2013.01); *H04L 63/20* (2013.01); *H04L 63/205* (2013.01)

(56) References Cited

U.S. PATENT DOCUMENTS

| | | | |
|---|---|---|---|
| 7,788,494 B2 | 8/2010 | Aissi et al. | |
| 7,836,484 B2 | 11/2010 | Pardo-Blazquez et al. | |
| 8,364,970 B2* | 1/2013 | Fu | G06F 21/6218 713/185 |
| 8,533,796 B1* | 9/2013 | Shenoy | H04L 63/0815 380/229 |
| 8,763,102 B2 | 6/2014 | Furman et al. | |
| 8,849,858 B2* | 9/2014 | Lim | G06F 21/6218 707/785 |
| 8,893,293 B1 | 11/2014 | Schmoyer et al. | |
| 8,935,757 B2 | 1/2015 | Srinivasan et al. | |
| 9,003,050 B2 | 4/2015 | Karlsson et al. | |
| 9,043,886 B2 | 5/2015 | Srinivansan et al. | |
| 9,197,623 B2 | 11/2015 | Srinivasan et al. | |
| 9,237,145 B2 | 1/2016 | Sondhi et al. | |
| 9,350,718 B2 | 5/2016 | Sondhi et al. | |
| 9,374,356 B2 | 6/2016 | Sondhi et al. | |
| 9,407,628 B2 | 8/2016 | Sondhi et al. | |
| 2001/0056354 A1 | 12/2001 | Feit et al. | |
| 2002/0101858 A1 | 8/2002 | Stuart et al. | |
| 2002/0184535 A1 | 12/2002 | Moaven et al. | |
| 2004/0128558 A1 | 7/2004 | Barrett | |
| 2006/0021019 A1 | 1/2006 | Hinton et al. | |
| 2006/0095779 A9 | 5/2006 | Bhat et al. | |
| 2006/0206931 A1 | 9/2006 | Dillaway et al. | |
| 2006/0218625 A1* | 9/2006 | Pearson | H04L 63/0428 726/4 |
| 2008/0010455 A1 | 1/2008 | Holtzman et al. | |
| 2009/0193507 A1 | 7/2009 | Ibrahim | |
| 2009/0292927 A1 | 11/2009 | Wenzel et al. | |
| 2009/0296936 A1 | 12/2009 | Lie et al. | |
| 2009/0300355 A1* | 12/2009 | Crane | G06F 21/33 713/168 |
| 2010/0011421 A1 | 1/2010 | Chari et al. | |
| 2010/0043065 A1 | 2/2010 | Bray et al. | |
| 2010/0100952 A1 | 4/2010 | Sample et al. | |
| 2010/0146570 A1 | 6/2010 | Kim et al. | |
| 2010/0212004 A1 | 8/2010 | Fu et al. | |
| 2011/0067095 A1 | 3/2011 | Leicher et al. | |
| 2011/0131643 A1 | 6/2011 | Lawrence et al. | |
| 2011/0239283 A1 | 9/2011 | Chern | |
| 2011/0296504 A1* | 12/2011 | Burch | H04L 63/0815 726/6 |
| 2011/0314532 A1 | 12/2011 | Austin et al. | |
| 2011/0314533 A1 | 12/2011 | Austin et al. | |
| 2012/0005733 A1* | 1/2012 | Ross | G06F 21/33 726/6 |
| 2012/0023556 A1 | 1/2012 | Schultz et al. | |
| 2012/0028609 A1 | 2/2012 | Hruska | |
| 2012/0066757 A1 | 3/2012 | Vysogorets et al. | |
| 2012/0117626 A1* | 5/2012 | Yates | H04L 63/101 726/4 |
| 2012/0144034 A1 | 6/2012 | McCarty | |
| 2012/0144457 A1 | 6/2012 | Counterman | |
| 2012/0144501 A1 | 6/2012 | Vangpat et al. | |
| 2012/0151564 A1 | 6/2012 | Robert et al. | |
| 2012/0167185 A1 | 6/2012 | Menezes et al. | |
| 2012/0173610 A1 | 7/2012 | Bleau et al. | |
| 2012/0216268 A1 | 8/2012 | Kassaei et al. | |
| 2012/0227098 A1 | 9/2012 | Obasanjo et al. | |
| 2012/0233334 A1 | 9/2012 | Braudes et al. | |
| 2012/0278876 A1 | 11/2012 | Mcdonald | |
| 2012/0311663 A1* | 12/2012 | Seidl | G06F 21/41 726/1 |
| 2012/0331536 A1* | 12/2012 | Chabbewal | G06F 21/33 726/7 |
| 2013/0007846 A1* | 1/2013 | Murakami | H04W 12/08 726/4 |
| 2013/0014258 A1 | 1/2013 | Williams | |
| 2013/0024371 A1 | 1/2013 | Hariramani et al. | |
| 2013/0024919 A1* | 1/2013 | Wetter | G06F 21/335 726/6 |
| 2013/0086645 A1 | 4/2013 | Srinivasan et al. | |
| 2013/0086657 A1* | 4/2013 | Srinivasan | H04L 63/10 726/6 |
| 2013/0086669 A1 | 4/2013 | Sondhi et al. | |
| 2013/0103802 A1 | 4/2013 | Kawato | |
| 2013/0117826 A1 | 5/2013 | Gordon et al. | |
| 2013/0160099 A1 | 6/2013 | Fitzpatrick, III | |
| 2013/0160144 A1 | 6/2013 | Mok et al. | |
| 2013/0212486 A1 | 8/2013 | Joshi et al. | |
| 2013/0227663 A1 | 8/2013 | Cadenas-Gonzalez | |
| 2013/0283362 A1 | 10/2013 | Kress et al. | |
| 2014/0007213 A1 | 1/2014 | Sanin et al. | |
| 2014/0020073 A1* | 1/2014 | Ronda | G06F 21/31 726/7 |
| 2014/0025753 A1 | 1/2014 | Gronowski et al. | |
| 2014/0033278 A1 | 1/2014 | Nimashakavi et al. | |
| 2014/0033279 A1 | 1/2014 | Nimashakavi et al. | |
| 2014/0033280 A1 | 1/2014 | Nimashakavi et al. | |
| 2014/0095874 A1 | 4/2014 | Desai et al. | |
| 2014/0136346 A1 | 5/2014 | Teso | |
| 2014/0173753 A1 | 6/2014 | Sanso et al. | |
| 2014/0187240 A1 | 7/2014 | Chen | |
| 2014/0220933 A1 | 8/2014 | Lynes et al. | |
| 2014/0350979 A1 | 11/2014 | Paetzold et al. | |
| 2014/0372367 A1 | 12/2014 | McLean et al. | |
| 2014/0380428 A1 | 12/2014 | Kobayashi | |
| 2014/0380429 A1 | 12/2014 | Matsugashita | |
| 2015/0050972 A1 | 2/2015 | Sarrafzadeh et al. | |
| 2015/0089569 A1 | 3/2015 | Sondhi et al. | |
| 2015/0089570 A1 | 3/2015 | Sondhi et al. | |
| 2015/0089596 A1 | 3/2015 | Sondhi et al. | |
| 2015/0089597 A1 | 3/2015 | Srinivasan et al. | |
| 2015/0089617 A1 | 3/2015 | Sondhi et al. | |
| 2015/0089622 A1 | 3/2015 | Sondhi et al. | |
| 2015/0089623 A1 | 3/2015 | Sondhi et al. | |
| 2015/0156190 A1 | 6/2015 | Sanso et al. | |
| 2015/0200948 A1 | 7/2015 | Cairns et al. | |
| 2016/0028737 A1 | 1/2016 | Srinivasan et al. | |
| 2016/0080361 A1 | 3/2016 | Sondhi et al. | |

OTHER PUBLICATIONS

Notice of Allowance for U.S. Appl. No. 13/631,538 (Sep. 2, 2014) 9 pages.
Non-Final Office Action mailed Apr. 23, 2015 in U.S. Appl. No. 14/266,472, 9 pages.
Non-Final Office Action mailed Apr. 27, 2015 in U.S. Appl. No. 14/266,478, 12 pages.
PCT Patent Application No. PCT/US2012/57754, International Search Report mailed on May 14, 2014, 9 pages.
Lodderstedt et al. "OAuth 2.0 Security Considerations," Internet-Draft, Internet Engineering Task Force (Apr. 2011).
Hardt, et al., "OAuth Web Resource Authorization Profiles draft-hardt-oauth-01", Jan. 2010, XP055075817, [retrieved on Aug. 20, 2013]. Retrieved from the Internet: <URL:https://tools.ietf.org/html/draft-hardt-oauth-01>, 40 pages.
Hammer-Lahav, E., "The OAuth 1.0 Protocol", RFC 5849, Apr. 2010, [retrieved on Mar. 12, 2015]. Retrieved from the Internet: <URL:https://tools.ietf.org/html/rfc5849>, 38 pages.
International Search Report and Written Opinion mailed Jan. 22, 2015 in Int'l Patent Application No. PCT/US2014/056466, 11 pages.
Notice of Allowance mailed Jan. 22, 2015 in U.S. Appl. No. 13/464,880, 13 pages.
Bussard, L. et al., Delegation of access rights in multi-domain service compositions, pp. 137-155, Springerlink.com, 2009.
Hardt, "The Oauth 2.0 Authorization Framework" RFC:6749, Oct. 2012, pp. 1-76, https://tools.letf.org/html/rfc6749#page-23.
Huang, Frank Mintzu, SportMingles Sports Social Network for iOS, pp. 1-24, The University of Texas at Austin, 2012.
Hunt, P., Chain grant type for OAuth2, Internet-draft, Oracle Corporation, 2012.

(56) References Cited

OTHER PUBLICATIONS

Jaramillo, D. et al., Cross-Platform, Secure Message Delivery for Mobile Devices, Apr. 2013, IEEE.
Mortimore, C. et al., "Oauth 2.0 Assertion Profile; draft-ietf-oauth-assertions-00.text", Internet Engineering Task Force, IETF; Standarworkingdraft, Internet Society (ISOC) 4, Rue Des Falaises CH-1205 Geneva, Switzerland, Jul. 4, 2011, XP015076865.
MSDN, "Single Sign-on/Custom Authentication" Apr. 2011, pp. 1-3 http://web.archive.org/web/20110424075544/http://msdn.microsoft.com/en-us/library/bb969522(v=office.12)/aspx.
Noureddine, M. et al., "A provisioning model towards Oauth 2.0 performance optimization", Cybernetic Intelligent Systems (CIS), 2011 IEEE 10th International Conference on, IEEE, Sep. 1, 2011, pp. 76-80, XP032328923.
Non-Final Office Action mailed Jun. 4, 2015 in U.S. Appl. No. 14/266,496, 31 pages.
Notice of Allowance mailed Jul. 8, 2015 in U.S. Appl. No. 14/266,472, 11 pages.
Extended European Search Report mailed Jul. 14, 2015 in EP Patent Application No. 12773179.2, 6 pages.
Non-Final Office Action mailed Jul. 17, 2015 in U.S. Appl. No. 14/266,466, 9 pages.
Non-Final Office Action mailed Aug. 13, 2015 in U.S. Appl. No. 14/266,454, 14 pages.
Notice of Allowance mailed Aug. 28, 2015 in U.S. Appl. No. 14/266,478, 22 pages.
Non-Final Office Action mailed Sep. 1, 2015 in U.S. Appl. No. 14/266,505, 12 pages.
Non-Final Office Action mailed Sep. 8, 2015 in U.S. Appl. No. 14/266,486, 16 pages.
Non-Final Office Action mailed Nov. 23, 2015 in U.S. Appl. No. 14/878,412, 12 pages.
Non-Final Office Action mailed Dec. 18, 2015 in U.S. Appl. No. 14/266,496, 21 pages.
Notice of Allowance mailed Jan. 15, 2016 in U.S. Appl. No. 14/266,466, 9 pages.
Notice of Allowance mailed Feb. 24, 2016 in U.S. Appl. No. 14/266,486, 16 pages.
Final Office Action mailed Mar. 3, 2016 in U.S. Appl. No. 14/266,505, 17 pages.
Final Office Action mailed Mar. 17, 2016 in U.S. Appl. No. 14/266,454, 17 pages.
Notice of Allowance mailed Mar. 28, 2016 in U.S. Appl. No. 14/951,438, 12 pages.
Notice of Allowance mailed Mar. 31, 2016 in U.S. Appl. No. 14/878,412, 14 pages.
International Preliminary Report on Patentability mailed Mar. 31, 2016 in Int'l Patent Application No. PCT/US2014/056466, 7 pages.
U.S. Appl. No. 14/266,496, Final Office Action mailed Jun. 30, 2016, 8 pages.
U.S. Appl. No. 15/099,426, Non-Final Office Action mailed Jul. 28, 2016, 6 pages.
Non-Final Office Action for U.S. Appl. No. 13/631,538 (Jan. 2, 2014) 18 pages.
Final Office Action for U.S. Appl. No. 13/631,538 (May 15, 2014) 16 pages.
Non-Final Office Action for U.S. Appl. No. 13/464,880 (Mar. 28, 2014) 19 pages.
Demchenko et al. "Authorization Infrastructure for On-Demand Network Resource Provisioning," 2008 9th IEEE/ACM International Conference on Grid Computing, pp. 95-103 (Oct. 2008).
Hammer-Lahav, E., "The OAuth 2.0 Protocol", Draft, Jul. 11, 2010, 45 pages.
U.S. Appl. No. 14/266,505, Notice of Allowance mailed Aug. 25, 2016, 9 pages.
U.S. Appl. No. 14/266,496, Notice of Allowance mailed Aug. 17, 2016, 16 pages.

\* cited by examiner

PLUGGABLE AUTHORIZATION POLICIES

CLAIM OF PRIORITY

The present application claims priority under 35 U.S.C. §119(e) to U.S. Provisional Patent Application Ser. No. 61/880,335, filed Sep. 20, 2013, and titled "MULTIPLE RESOURCE SERVERS WITH SINGLE, FLEXIBLE, PLUGGABLE OAUTH SERVER AND OAUTH-PROTECTED RESTFUL OAUTH CONSENT MANAGEMENT SERVICE, AND MOBILE APPLICATION SINGLE SIGN ON OAUTH SERVICE," the entire contents of which are incorporated by reference herein.

CROSS REFERENCE TO RELATED APPLICATIONS

The present application is related to U.S. Provisional Patent Application Ser. No. 61/541,026, filed Sep. 29, 2011, and titled "RELYING PARTY AND OAUTH FRAMEWORK," the entire contents of which are incorporated by reference herein. The present application is also related to U.S. patent application Ser. No. 13/631,538, filed Sep. 28, 2012, and titled "OAUTH FRAMEWORK," the entire contents of which are incorporated by reference herein.

BACKGROUND

An identity management system is an information system, or a set of technologies that can be used for enterprise or cross-network identity management. Identity management describes the management of individual identities, their authentication, authorization, roles, and privileges within or across system and enterprise boundaries with the goal of increasing security and productivity while decreasing cost, downtime, and repetitive tasks. One aspect of identity management is "single sign-on" (SSO). One standard that is particularly useful in the field of identity management is OAuth.

SSO is a property of access control of multiple related but independent software systems. With this property, a user logs in once and gains access to all systems without being prompted to log in again at each of them. Conversely, single sign-off is the property whereby a single action of signing out terminates access to multiple software systems. As different applications and resources support different authentication mechanisms, single sign-on internally translates to and stores different credentials compared to what is used for initial authentication. SSO reduces phishing success, because users are not trained to enter passwords everywhere without thinking SSO reduces password fatigue from different user name and password combinations. SSO reduces time spent re-entering passwords for the same identity. SSO reducing information technology (IT) costs due to a lower number of IT help desk calls about passwords. SSO provides security on all levels of entry/exit/access to systems without the inconvenience of re-prompting users. SSO also allows for centralized reporting for compliance adherence. SSO uses centralized authentication servers that all other applications and systems utilize for authentication purposes, and combines this with techniques to ensure that users do not have to actively enter their credentials more than once.

OAuth is an open standard for authorization. An indirect effect of authorization is authentication. OAuth allows users to share their private resources (e.g., photos, videos, contact lists, etc.) stored on one site with another site without having to hand out their credentials, typically supplying username and password tokens instead. Each token grants access to a specific site for specific resources and for a defined duration. This allows a user to grant a third party site access to their information stored with another service provider, without sharing their access permissions or the full extent of their data. For example, a token might grant access to a video editing site for videos from a specific album for the next two hours.

For example, in a typical scenario, a user of LinkedIn might be asked for permission to import, into LinkedIn, that user's contacts from Yahoo. LinkedIn might want to obtain these contacts in order to send e-mail messages inviting each of the user's contacts to join LinkedIn, for example. Prior to OAuth, this request for permission might have involved a request that the user provide, to LinkedIn, the user's Yahoo user identity and password. This information was requested so that LinkedIn could log-in to the user's Yahoo account as that user, and then obtain that user's contacts from that user's Yahoo account. Generally speaking, permitting LinkedIn (or any site) with the user's Yahoo (or any other site) identity and password is a bad idea because it grants the former site unlimited access to the user's account on the latter site. Such unlimited access is nearly always much more access than the former site actually requires to accomplish its goal, such as merely obtaining a contact list.

A better idea is to provide the former site with a limited authorization relative to the user's account on the latter site. The limited authorization may specify a specific set of operations that the former site can perform relative to the user's account on the latter site. For example, referring to the typical scenario above, the limited authorization might specify that LinkedIn can only access the user's contact list, but perform no other operations relative to the user's account, on Yahoo. OAuth allows for such limited authorization. OAuth provides delegation of authorization.

The technique by which OAuth delegates authorization may be understood relative to an analogy. Often, when a car owner temporarily relinquishes control of his car to a valet so that the valet can park the car for the owner, the owner does not provide a general-use master key to the valet, but instead provides a more limited-use valet key to the valet. The valet key permits the valet with sufficient access to drive the car, but does not provide the valet with access to everything that the owner possesses within the car. In the same manner, the use of OAuth may grant a first site access to a user's contact list stored by a second site, without also permitting the first site to perform other operations relative to the user's account on the second site—such as reading e-mail messages that might be stored on the second site, for example. OAuth allows the first site to be given a limited authorization to perform a specified set of operations, and no others, relative to the second site.

For another example, a user might want to use a photo printing service provided by a first site, such as Snapfish, to print certain color photos that are electronically stored on a second site, such as Flickr, which is independent of the first site. More specifically, the user might want to print only the photos that are stored in a particular album on Flickr, such as an album containing photos from the user's recent visit to Alaska. Although the user might have a multitude of different albums stored on his Flickr account, the user might want to print only the photos from the Alaska album. Under such circumstances, the user probably prefers that Snapfish does not access the contents of any of his Flickr albums other than those contained within the Alaska album. In the foregoing scenario, using OAuth terminology, Snapfish is considered to be a client, and Flickr is considered to be a resource server (the photo data being the resources) as well as an OAuth authorization server. As the owner of the resources (e.g., photo data) stored by the resource server, the user is also a resource owner.

Given the example presented above, the user might first use his Internet browser application to instruct the client (e.g., Snapfish) to print the photos in the user's Alaska album on the resource server (e.g., Flickr). In response, the client (e.g., Snapfish) redirects the user to the site of the resource server (e.g., Flickr). This redirection operation may indicate, to the resource server, the limited set of data (e.g., contents of the Alaska album) to which the client desires access. At that moment, the resource server does not know who the user is, as the user has not yet authenticated himself to the resource server. Therefore, the resource server requires the user to authenticate. As is mentioned above, an indirect effect of authorization is authentication. After the user authenticates himself to the resource server (e.g., by providing his username and password that are relevant to the resource server), the resource server sends a consent page to the user's Internet browser. The consent page asks the user to verify that the resource server (e.g., Flickr) has the user's permission to provide a limited, specified set of data (e.g., contents of the Alaska album) to the client (e.g., Snapfish). Assuming that the user consents, the resource server then responsively sends an authorization code to the client. This authorization code may be sent through the "front channel;" or, in other words, via the user's Internet browser using a redirect.

For purposes of the following discussion, the resource server also serves the role of OAuth authorization server, but is referred to as being the resource server. In this scenario, the client (e.g., Snapfish) is a trusted partner of the resource server (e.g., Flickr). The client receives the authorization code, or "grant," and stores the authorization code. The client maintains this authorization code indefinitely, until the user actively revokes that authorization code. The user may log-in to the OAuth authorization server in order to see a list of grants that the OAuth authorization server has provided on the user's behalf to various clients. In response to receiving the authorization code, the client (e.g., Snapfish) makes a "back channel" call to the resource server (e.g., Flickr). A back channel call is a communication that does not involve the user's Internet browser. The back channel call requests an access token from the resource server. The access token specifies the scope of the access that the client is permitted to the user's account on the resource server. For example, the access token might indicate that the client is permitted access only to contents of the user's Alaska album. The resource server sends the requested access token back to the client via the back channel. The client stores the access token. Thereafter, until the access token expires, or until the user revokes the grant (i.e., the authorization code), the client can present the access token to the resource server in order to access, on the resource server, the resources specified by the access token. If the user has already revoked the grant related to the access token, then the access token becomes ineffective even if the access token has not yet expired.

In addition to an access token, the resource server may provide a "refresh token" to the client. While the access token often has a specified longevity after which it expires, a refresh token is a long-lived token. The client may store the refresh token along with the related access token. Thereafter, if the resource server objects that the client's current access token has expired, then the client may present the refresh token to the resource server in order to obtain a new access token from the resource server.

Beneficially, the approach employed by OAuth avoids the disclosure, to the client, of the user's password for the user's account on the resource server. The avoidance of this disclosure of credentials prevents the client from performing unauthorized actions relative to the user's account on the resource server. The only time that the user supplies his password is during the user's initial authentication directly with the resource server, after being redirected from the client's site.

BRIEF SUMMARY

Embodiments of the present invention relate to identity management, authentication, and authorization frameworks. In one embodiment, a framework is provided for integrating Internet identities in enterprise identity and access management (IAM) infrastructures. According to another embodiment, a framework is provided for open authorization.

Traditionally, a resource server and an OAuth authorization server have been the same entity. According to an embodiment of the invention, a generic framework is provided that frees a resource server from the responsibilities of an OAuth authorization server. These responsibilities can include scope management, issuance of authorization tokens, issuance of refresh tokens, and issuance of access tokens. Thus, a generic OAuth authorization server can be implemented according to this generic framework. Consequently, each individual resource server does not need to implement its own proprietary OAuth authorization server. Indeed, according to an embodiment of the invention, multiple different resource servers can all concurrently make use of the functions of the same generic OAuth authorization server. For example, in an embodiment of the invention, a single OAuth authorization server can manage scopes for several different resource servers all at the same time. There can be a many-to-one relationship between resources servers and an OAuth authorization server.

In one embodiment of the invention, in order to achieve this ability to interact with multiple different resource servers, the generic OAuth authorization server maintains mapping data that indicates which tokens belong to which resource servers, who the trusted partners of each resource server are, etc. Furthermore, in an embodiment of the invention, the generic OAuth framework is constructed in such a manner that a resource server administrator can easily customize the framework to accommodate the particular use case for his resource server. Different resource server administrators can "plug-in" their specific components into the generic OAuth framework. Thus, in one embodiment of the invention, each resource server informs the generic OAuth authorization server regarding the potential scopes (i.e., limited operations relative to resources) that the resource server might use.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details. The entire contents of U.S. Provisional Patent Application Ser. No. 61/541,026, filed Sep. 29, 2011, and titled "RELYING PARTY AND OAUTH FRAMEWORK," are incorporated by reference herein.

General OAuth System Architecture

Figure 1:
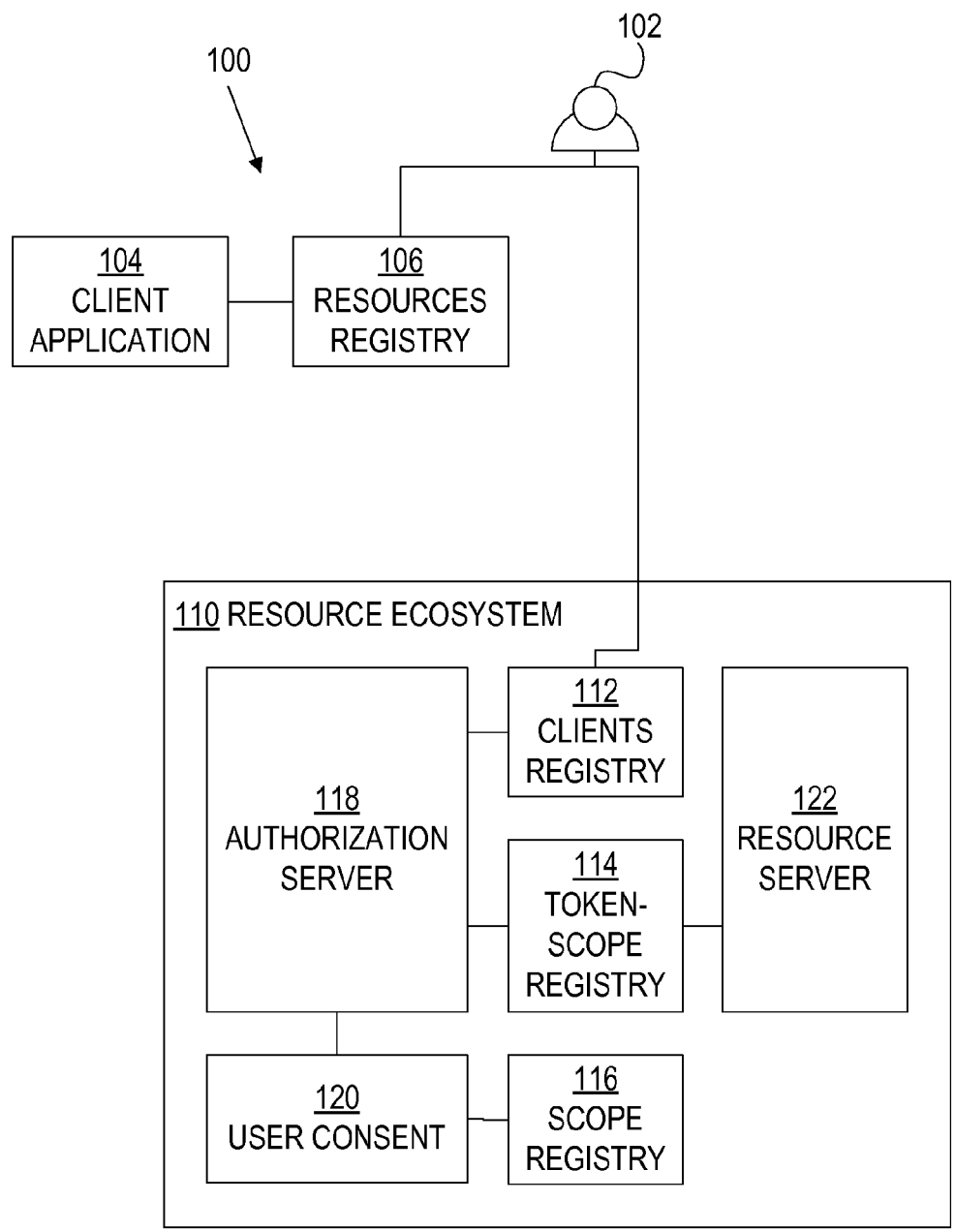
FIG. 1 is a block diagram illustrating an OAuth system architecture and logical components thereof, according to an embodiment of the invention.

FIG. 1 is a block diagram illustrating an OAuth system architecture 100 and logical components thereof, according to an embodiment of the invention. Architecture 100 includes a resource owner (or user) 102, a client application 104, a resources registry 106, and a resource ecosystem 110. Resource ecosystem includes a clients registry 112, a token-scope registry 114, a scope registry 116, a user consent 120, and a resource server 122. Although one resource server 122 is shown, embodiments of the invention can include multiple separate resource servers. As seen from the connections in FIG. 1, client application 104 interacts with resources registry 106. Resource owner 102 interacts with resources registry 106 and with clients registry 112. Authorization server 118 interacts with clients registry 112, token-scope registry 114, and user consent 120. Resource server 122 interacts with token-scope registry 114. User consent 120 interacts with scope registry 116. These components and their functions are discussed further below.

Embodiments of the invention can involve the delegation of authorization. Different resource use cases sometimes require different scope definitions. Different resources sometimes can rely on different authorization models and solutions. Different specific user actions can be required to give a client application consent to access resources maintained by different resource servers. Preferably, each different resource provider should not need to offer a separate proprietary OAuth authorization server to integrate with the specifics of that resource provider. The unfortunate result of each resource provider offering a separate proprietary OAuth authorization server would be that an enterprise wishing to integrate with multiple different resource providers and multiple different client form factors will have to deal with a myriad of different OAuth authorization server interfaces.

Therefore, in an embodiment of the invention, a generic OAuth framework architecture is provided. The framework can include OAuth wire protocol components (client and server), including metadata and runtime registries. The framework can include an infrastructure of pluggable "contracts" to customize and deploy application-specific solutions.

In one embodiment of the invention, resource server 122 stores, in token-scope registry 114, indications of the scopes that resource server 122 recognizes. Each such scope can be indicative of a different set of operations that can be performed relative to a different set of resources stored on resource server 122. Inasmuch as certain embodiments may include multiple different or separate resource servers, token-scope registry 114 can store mapping between different resource servers and different scopes. Furthermore, in one embodiment of the invention, each scope is mapped to a separate token within token-scope registry 114. Thus, by reference to token-scope registry 114, resource server 122 can determine the set of operations and the set of resources that are mapped to a particular token presented to resource server 122 by client application 104. Resource server 122 can limit the operations performed by client application 104 relative to resources maintained by resource server 122 to those operations specifically indicated by the set of operations mapped to the particular token.

Thus, in one embodiment of the invention, each particular resource server in a group of multiple resource servers provides, to the OAuth framework, a different set of metadata that indicates the scopes that can be mapped to tokens that can be used to access resources on that particular resource server. The scopes are therefore customizable by the administrators of the resource servers, making the OAuth framework flexible and applicable to many different use cases. Consequently, many different types of resource servers can all make use of the same generic OAuth framework without requiring the creation of a specific OAuth framework for each different type of resource server.

In an embodiment, the generic OAuth framework shown in FIG. 1 provides a basic conceptual structure. The OAuth framework can layer on top of existing identity management products. In the OAuth framework, contracts can define integration points with these existing products. The combination of the OAuth framework and contract implementations can fulfill miscellaneous use cases and deployment options. According to an embodiment, the OAuth framework includes two broad "roles": a consumer/client role, and an authorization server/resource server role. The authorization server/resource server role is discussed below with reference to FIG. 2, while the consumer/client role is discussed below with reference to FIG. 3.

Figure 2:
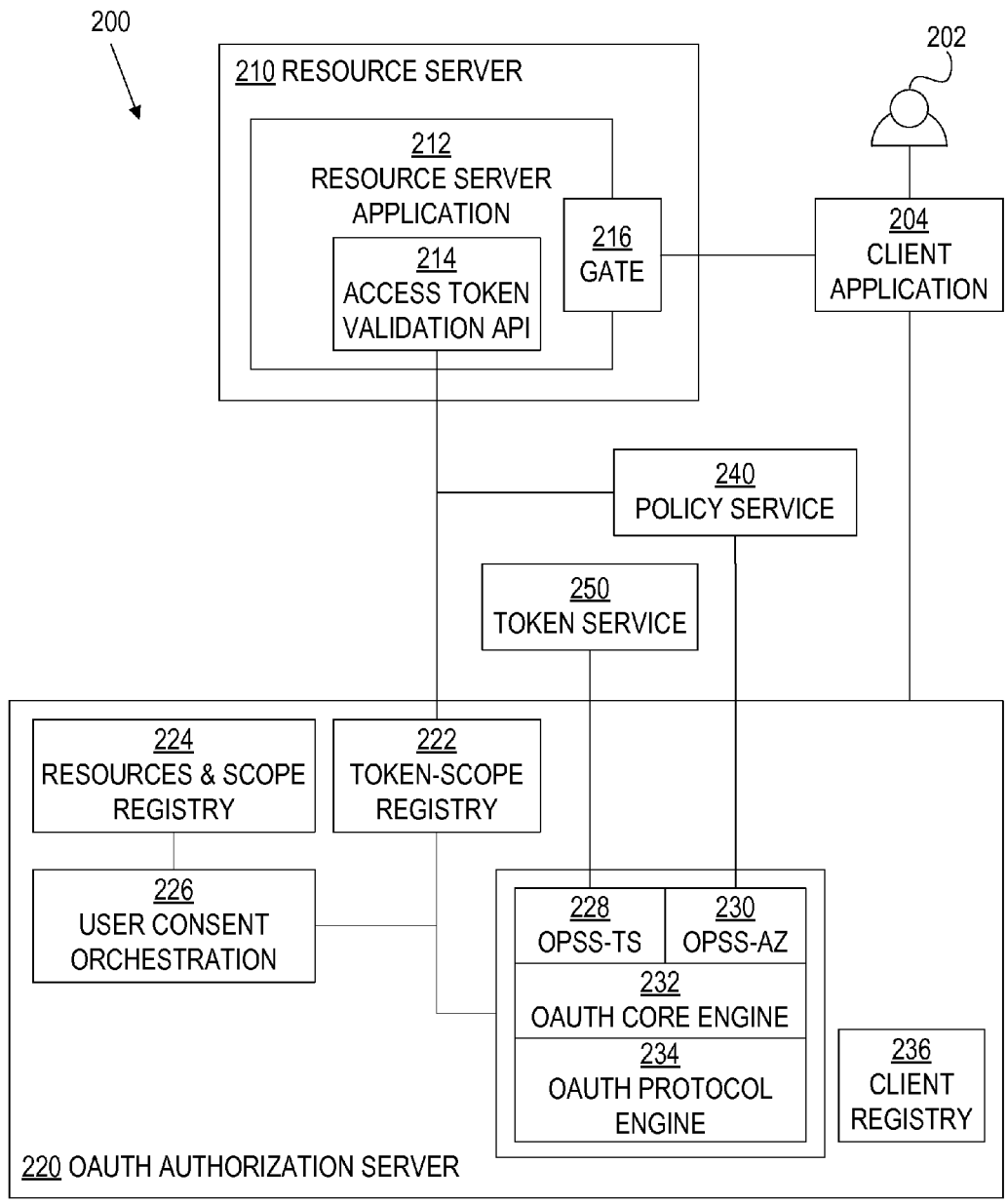
FIG. 2 is a block diagram illustrating a resource server environment, according to an embodiment of the invention.

FIG. 2 is a block diagram illustrating a resource server environment 200, according to an embodiment of the invention. In an embodiment of the invention, environment 200 includes resource owner (or user) 202, client application 204, resource server 210, OAuth authorization server 220, policy service 240, and token service 250. Resource server 210 includes resource server application 212, which includes access token validation API 214 and gate 216. OAuth authorization server 220 includes token-scope registry 222, resources & scope registry 224, user consent orchestration 226, OPSS-TS (Oracle Platform Security Services-TS) 228, OPSS-AZ (Oracle Platform Security Services-AZ) 230, OAuth core engine 232, OAuth protocol engine 234, and client registry 236. In an embodiment, resource owner 202 interacts with client application 204 through gate 216, which accesses access token validation API 214. Client application 204 also interacts with OAuth authorization server 220. Access token validation API 214 interacts with token-scope registry 222 and with policy service 240. OPSS-TS interacts with token service 250. OPSS-AZ interacts with policy service 250. Components 228-234 collectively interact with token-scope registry 222 and with user consent orchestration 226. User consent orchestration 226 interacts with resources & scope registry 224.

In an embodiment of the invention, resources & scope registry 224 stores resource information, scopes, and miscellaneous metadata related to resources and services exposed via OAuth authorization server 220. In an embodiment of the invention, client registry 236 stores trust keys and secrets for authorized remote clients (e.g., client application 204). In an embodiment, token-scope registry 222 stores access tokens and refresh tokens that are issued to clients (e.g., client application 204) based on user (e.g., resource owner 202) consent. In an embodiment, token-scope registry 222 stores AuthZ scope information that is associated with issued access tokens.

In an embodiment of the invention, resource server 210 registers its own metadata with OAuth authorization server 220. Different resource servers can register different metadata with the same OAuth authorization server. As part of the registration process, this metadata is imported into OAuth authorization server 220. The metadata indicates the various different scopes recognized by, or exposed by, resource server 210. Each scope specifies a different subset of the resources maintained by resource server 210. In an embodiment of the invention, at the time of registration, each scope recognized by resource server 210 is mapped to resource server 210 (only) in resources & scope registry 224. Thus, in an embodiment of the invention, resources & scope registry indicates, for each registered scope, the set of the corresponding resource server's resources that are accessible within that scope. A scope might indicate, for example, that only a particular photo is accessible, or that a particular folder of photos is accessible, or that a particular set of folders is accessible. A scope can indicate operations that are permissible relative to specified resources, such as read, update, delete, create, etc.

In an embodiment of the invention, OAuth authorization server 220 issues access tokens to client application 204. In an embodiment, for each such access token, OAuth authorization server 220 stores, in token-scope registry 222, a mapping between that access token and the particular scope (selected from among the scopes stored in resources & scope registry 224) that is assigned to that access token. Different access tokens for the same resource server may have different scopes assigned to them. Thus, when client application 204 presents an access token to OAuth authorization server 220, OAuth authorization server 220 may refer to token-scope registry 222 to determine the scope that is mapped to that access token, and then may refer to resources & scope registry 224 to determine the resources that are accessible within that scope.

In an embodiment of the invention, user consent from resource owner 202 is required in order for OAuth authorization server 220 to grant an access token to client application 204. For example, if client application 204 requests access to a particular resource (or a particular scope including that resource) from resource server 210, then resource server 210 may redirect the request to OAuth authorization server 220. OAuth authorization server 220 may invoke user consent orchestration 226 in order to ask resource owner 202 to verify that client application 204 should be granted access to the particular resource (or particular scope). In an embodiment, user consent orchestration 226 indicates, to resource owner 202, the scope to which client application 204 is seeking access, and provides resource owner 202 with the opportunity to consent to or decline access of that scope. More specifically, OAuth authorization server 220 may ask resource owner 220 to verify that client application 204 should be granted access specified by the particular scope (as indicated in resources & scopes registry 224), including the particular resource. In response to receiving consent from resource owner 202, OAuth authorization server 220 may generate an access token and store, in token-scope registry 222, a mapping between that access token and the particular scope. OAuth authorization server 220 can provide the access token to client application 204.

Client application 204 can then attempt to access the particular resource on resource server 210 by presenting the access token to resource server application 212. An agent on resource application server 212 can intercept the token and validate the token with OAuth authorization server 220 (e.g., via access token validation API 214) before allowing client application 204 to access the particular resource. If the particular resource that client application 204 attempts to access does not fall within the scope that is mapped the access token in token-scope registry 222 (e.g., if client application 204 attempts to access a folder that is outside of the scope of access to which resource owner 202 previously consented), then OAuth authorization server 220 will not validate the token, and resource server 210 will refuse to grant client application 204 access to the particular resource. Thus, scope of access is based on specific consent to that scope by resource owner 202. Resource owner 202 has the opportunity to refuse to give consent to a specific scope requested by client application 204, in which case OAuth authorization server 220 will not create an access token for client application 204. In one embodiment of the invention, each client application's request to access a resource maintained by resource server 210 also specifies a scope that is mapped to resource server 210 in resources & scope registry 224, and it is this specified scope for which the consent of resource owner 202 is requested as discussed above.

According to an embodiment of the invention, consistent with the discussion above, enforcement of access restrictions occurs at the time that client application 204 presents an access token to resource server 210. Enforcement requires an understanding of the scope that is encoded by the access token. Access tokens are issued by OAuth authorization server 220 per the scope definitions. Access tokens are validated per the scope that is encoded by the issued tokens. In one embodiment of the invention, policy service 240 and token service 250 in combination maintain the state of the access tokens that were issued and authorize issued access tokens. In an embodiment of the invention, a customer (i.e., owner and/or operator of resource server 210) can provide its own policy service 240 and token service 250. The OAuth framework may provide programmatic contracts, or programmatic interfaces, by which such customers can plug their own policy and token services into the OAuth framework in a manner that matches the scopes that those customers define. Each customer may publish its own set of scopes. The published set of scopes may indicate the form of the data that the customer's token service will return. The OAuth framework additionally may provide, to such customers, programming contracts or programmatic interfaces that permit policies to be created at the time of token issuance. These programmatic contracts or programmatic interfaces allow customers to plug their own custom programmatic code into the OAuth framework. Using these programmatic interfaces, a customer can wire its existing infrastructure into the OAuth system. In an embodiment, a customer that publishes its set of scopes is responsible for ensuring that its token and/or policy services return tokens that include scope information that is consistent with the published scopes. In response to client application 204 attempting to use a token, OAuth authorization server 220 can invoke an application programming interface (API) that will look up the customer's policy and validate that token.

In an embodiment, the OAuth framework specifies the interfaces that the customer's code (e.g., the code for token service 250 and policy service 240) needs to implement in order to interface with OAuth authorization server 220. The interfaces may be published so that customers are aware of the parameters that each interface expects to receive and the values that each interface expects to return. When client application 204 makes a request of OAuth authorization server 220, OAuth authorization server 220 makes responsive calls to the APIs related to that request. These calls may involve calls to customer-coded components that generate access tokens and provide those access tokens to client application 204, for example. In one embodiment of the invention, OAuth authorization service 220 exposes the aforementioned programmatic contracts or programmatic interfaces in the form of OPSS-TS 228 and OPSS-AZ 230. The customer's own implementation of token service 250 can interface with OPSS-TS 228, while the customer's own implementation of policy service 240 can interface with OPSS-AZ 230. OAuth authorization server 220 may invoke separate APIs for access token creation and access token validation. The customer may implement custom programmatic code to perform each task. During validation, policies constructed during token creation can be accessed to determine whether the action that client application 204 seeks to perform relative to resources matches the policy that is encoded by the access token that client application 204 presents.

Additionally, in one embodiment of the invention, the customer's own implementation of user consent orchestration 226, which is invoked when client application 204 seeks an access token from OAuth authorization server 220, can be plugged into OAuth authorization server 220. Interfaces to resources & scope registry 224 and token-scope registry 222 may be provided to the customer so that the customer can design its implementation of user consent orchestration 226 to obtain data from components 222 and 224 for use in constructing the consent request.

In an embodiment of the invention, the mappings stored in resources & scope registry 224 indicate not only the subsets of resources that are included within each scope, but also the exclusive subsets of operations that are permitted to be performed by client application relative to those subsets of resources. For example, a particular mapping may indicate for a particular scope that read and update operations, but not create or delete operations, can be performed relative to a specified subset of resources (e.g., files, folders, directories, lists, profiles, images, documents, etc.) maintained on resource server 210. Thus, in one embodiment of the invention, the consent request discussed above specifies not only a subset of resources that are associated with a scope, but also a subset of operations that are associated with that scope. Consequently, resource owner 202 knows precisely the kinds of operations that he is giving consent for client application 204 to perform relative to the subset of resources within the consent-request-specified scope.

According to an embodiment of the invention, client application 204 requests resource access equivalent to one of the specific scopes that resource server 210 has registered with OAuth authorization server 220. Thus, in one embodiment of the invention, client application 204 is designed with an awareness of the specific scopes that will be registered for resource server 210. Because client application 204 may interact with resources maintained by a variety of different resource servers, the vendors of various resource servers may agree upon a standard set of scopes that their resource servers will register with OAuth authorization server 220, thereby easing the design task of the designers of client application 204 and other client applications.

Figure 3:
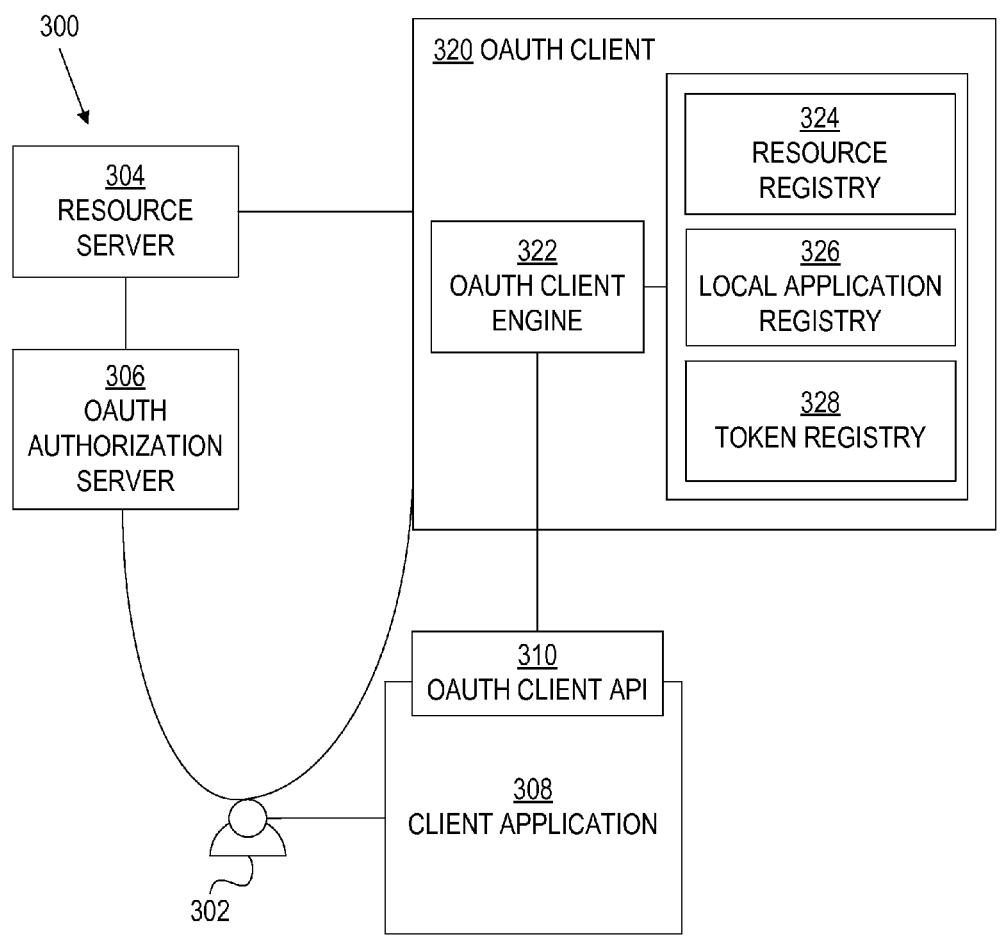
FIG. 3 is a block diagram illustrating an OAuth client environment, according to an embodiment of the invention.

In one embodiment of the invention, a client framework is provided in order to allow client applications, such as client application 204, to implement "hooks" for various different types of resource providers. For example, client application 204 might implement separate hooks for Google, Facebook, Yahoo, LinkedIn, etc. FIG. 3 is a block diagram illustrating an OAuth client environment 300, according to an embodiment of the invention. OAuth client environment 300 includes a resource owner 302, a resource server 304, an OAuth authorization server 306, a client application 308, and an OAuth client 320. Client application 308 includes an OAuth client API 310. OAuth client 320 includes an OAuth client engine 322, a resource registry 324, a local application registry 326, and a token registry 328. Resource server 304 and OAuth authorization server 306 interact with each other. Resource server 304 and OAuth client 320 interact with each other. OAuth authorization server 306 and OAuth client 320 interact with each other via resource owner 302 (e.g., through redirection accomplished by an Internet browser of resource owner 302). Resource owner 302 also interacts with client application 308. Client application 308 interacts with OAuth client engine 322 through OAuth client API 310. OAuth client engine 322 interacts with resource registry 324, local application registry 326, and token registry 328.

According to an embodiment of the invention, metadata regarding all of the different types of resource servers with which client application 308 may interact are stored within resource registry 324, enabling client application 308 to interact with a variety of different resource servers. Resource registry can indicate, for example, the different sets of scopes recognized by each different type of resource server. Consequently, client application 308 is able to request access corresponding to a particular scope recognized by resource server 304, and this particular scope may be specified in the consent request that OAuth authorization server 306 sends to resource owner 302 on behalf of client application 308. Resource providers can publish their OAuth standard-compliant scope specifications so that designers can populate resource registry 308 with the appropriate server-to-scope mappings for those providers' resource servers. In an embodiment, because resource registry 308 can be populated independently of client application 308, client application 308 does not need to be revised in order to interact with newly discovered resource servers; instead, developers can simply "plug-in" the new mappings for those resource servers into resource registry 324, with which client application 308 interacts.

Often, a complex website that acts as a resource provider or server is not a monolithic application. Often, instead, a complex website constitutes a variety of different applications. In an embodiment of the invention, local application registry 326 stores mappings between various different resource providers and the sets of applications that are offered or exposed by those resource providers. Each such application may be mapped in local application registry 326 to a separate Uniform Resource Locator (URL) for that application. In one embodiment of the invention, local application registry 326 stores trust keys to exercise the OAuth client role to access remote resources.

Typically, client application 308 is able to use a particular access token multiple times to access resources maintained by resource server 304 before that particular access token expires. In an embodiment of the invention, the access tokens that client application 308 obtains from OAuth authorization server 306 are stored within token registry 328. Inasmuch as client application 308 may interact with multiple different resource servers, token registry 328 can maintain mappings between access tokens and the different resource servers to which those access tokens pertain. Token registry 328 can store both access tokens and refresh tokens for various different remote resource servers (e.g., resource server 304) and scopes.

Multiple Resource Servers Interacting with Single OAuth Server

Embodiments of the invention include a framework that binds client applications to resource servers, thereby indicating whether various client applications are permitted to access various resource servers. A client application can make a pre-authorization request to an OAuth authorization server. The request can indicate that the client needs to access some specified resources. The client application can communicate with the OAuth authorization server to request a token that the client application can subsequently present to a resource server so that the resource server will allow the client application access to a resource stored on or provided by the resource server. The foregoing operations are performed on behalf of a human user.

Thus, a human user can attempt to perform an operation that requires a client application to access a resource server. Prior to accessing the resource server, the client application will communicate with the OAuth authorization server to ask the OAuth authorization server for a token so that the client application can access a resource that is stored on or provided by the resource server. According to an embodiment of the invention, the OAuth authorization server is a framework that externalizes the acquisition of such tokens.

A cloud-based computing environment can include many different services. For example, the environment can include a storage service, a messaging service, and other services. Each service can be provided by a separate resource server within the environment. A user might want to access certain of the user's resources that are maintained by a storage service, for example. The user may instruct a client application to access those resources on the user's behalf. In order to access the resources, the client application may need to first acquire a token that entitles the client application to read or write to the user's resources on the storage resource server that provides the storage service. According to an embodiment of the invention, the OAuth authorization server does not unilaterally make decisions as to whether such a token should or should not be granted. Instead, the OAuth authorization server externalizes those decisions to various authorization policy engines that are administered by resource servers that are external to the OAuth authorization server. Thus, the decision as to whether a token should or should not be granted, and the decision as to the scope of the permissions indicated by that token, can be decided by the resource server that provides the service to which the client application seeks access. In the case of a storage service, then, in response to the client application's request for a token, the OAuth authorization server can relay that request to the storage resource server that provides that storage service. The OAuth authorization server can relay different token requests to different resource servers, depending on the service to which access is sought.

Each service provided within the cloud computing environment can be associated with a potentially different service administrator. Service administrators can be users who are associated with the service administrator role for various services within a specific identity domain. An identity domain is a logical partition of a shared computing environment, such as a cloud computing environment. Such a logical partition can be one of several logical partitions that are isolated from each other by identity domain management software that executes on the hardware within the computing environment. Each such domain can be viewed as a "slice"

of the shared hardware and software resources within the computing environment that is associated with a potentially different customer (who may pay for the privilege of using that slice). Each identity domain can include user identities and instances of application software services—sometimes separate executing instances of the same software code. The identity domain management software can enforce isolation between identity domains by preventing users from one such domain from accessing the service instances that are not associated with that domain, and by preventing service instances that are associated with one such domain from accessing user identities that are associated with that domain.

One user can be a service administrator for one service, while another user can be a service administrator for another service. Each service can have a set of associated authorization policies that are specific to that service. A service's authorization policies can be administered and configured by the service administrator for that service. A service's authorization policies can indicate which users, or which user roles, are permitted to access various resources that the service provides. For example, a particular authorization policy for a particular storage service can indicate that a particular user is permitted to access a particular file that is provided by that particular storage service. For another example, an authorization policy can indicate different quota limits for different types of subscribers, such as gold-level subscribers and platinum-level subscribers.

According to an embodiment, in response to receiving a client application's request for a token, the OAuth authorization server can invoke a policy engine that is maintained by the resource server that provides the service. The policy engine is administered by the service's service administrator. The policy engine determines whether the request for the token is valid, and informs the OAuth authorization server. If the policy engine informs the OAuth authorization server that the request for the token is valid, then the OAuth authorization server will responsively return a token to the client application. Thus, the OAuth server acts as a framework.

According to an embodiment of the invention, the cloud computing environment in which the OAuth authorization server is located contains multiple separate identity domains that are isolated from each other. Each such identity domain can be associated with a separate tenant, or customer, such as a different business organization. Thus, a first business organization might be a first tenant that has exclusive access to a first identity domain in the cloud computing environment, and a second business organization might be a second tenant that has exclusive access to a second identity domain in the cloud computing environment. In spite of this partitioning of the cloud computing environment into isolated identity domains devoted to separate tenants, in one embodiment of the invention, all of the identity domains utilize a single OAuth authorization server instance for the cloud computing environment as a whole. This advantageously avoids the need to provision a separate OAuth authorization server for each separate identity domain. Further information about a multi-identity domain cloud computing environment can be found in U.S. patent application Ser. No. 13/838,813, filed on Mar. 15, 2013, and titled "MULTI-TENANCY IDENTITY MANAGEMENT SYSTEM"; and also in U.S. patent application Ser. No. 14/019,051, filed on Sep. 5, 2013, and titled "LDAP-BASED MULTI-TENANT IN-CLOUD IDENTITY MANAGEMENT SYSTEM." The entire contents of U.S. patent application Ser. No. 13/838, 813 and U.S. patent application Ser. No. 14/019,051 are incorporated by reference herein for all purposes.

Thus, according to an embodiment, client applications are located within distinct identity domains that are isolated from each other. Nevertheless, each client application, when seeking a token for the purposes of accessing a service, applies to the same cloud-wide OAuth authorization server instance for that token. The OAuth authorization server, in turn, relays the token requests to the various resource servers that provide the services to which those tokens pertain. The resource servers maintain the authorization policies that regulate the granting and generation of tokens for the services that those resource servers provide. Each resource server's set of authorization policies may differ from each other resource server's set of authorization policies. The authorization policies for one tenant may differ from the authorization policies for another tenant, even for the same service. Thus, in one embodiment, each multi-tenant-aware resource server can maintain multiple different sets of authorization policies, each pertaining to a separate identity domain that is devoted to a different tenant.

In one embodiment of the invention, the single cloud-wide OAuth authorization server maintains a separate virtualized "slice" of OAuth authorization server for each separate identity domain into which the cloud computing environment has been partitioned. For each such "slice," the OAuth authorization server can store separate configuration data—called an OAuth service profile—that pertains to the identity domain to which that slice is dedicated. Thus, the OAuth service profile that the OAuth authorization server stores for one identity domain can differ from the OAuth service profile that the OAuth authorization server stores for another identity domain. From the perspective of the various different tenants who are served by the cloud computing environment, the OAuth authorization server acts only on their behalf, and not on the behalf of any other tenants—this only appears to be the case to the tenants, however. The tenants are insulated from the fact that the OAuth authorization server maintains separate OAuth service profiles for separate identity domains. The multi-identity domain nature of the OAuth authorization server is obscured from the tenants who own those identity domains. Each tenant's client applications can interact with the OAuth authorization server in the multi-identity domain cloud computing environment in a manner that is similar to that in which those client applications would have interacted with an OAuth authorization server in a single identity domain enterprise environment implemented on that tenant's own computing machinery. The various client applications do not need to be modified to be made operable with the multi-tenant OAuth authorization server.

Thus, in an embodiment of the invention, the OAuth authorization server maintains a mapping between various identity domains and the OAuth service profiles for those identity domains. The OAuth authorization server as enhanced applies not just to a specific enterprise environment, but to an entire cloud computing environment that is partitioned into separate isolated identity domains. Client applications from various different identity domains can all use the same or similar destinations, or endpoints, to access the same OAuth authorization server. Such destinations can take the form of URLs, for example. Client applications do not need to be configured to use separate URLs for separate OAuth authorization servers. In one embodiment, the URLs that each identity domain's client applications use to access the single cloud-wide OAuth authorization server have the same suffix, but different prefixes that identify that identity domain. The OAuth authorization server can use this identity domain prefix in order to determine which particular OAuth service profile, from the multiple sets of OAuth service profiles that the server maintains, applies to a particular client application from which the OAuth authorization server receives a token request.

In an embodiment, the single cloud-wide multi-tenant OAuth authorization server still relays token requests to resource servers that provide the services to which those requests pertain. Those resource servers, and not the OAuth authorization server, maintain the authorization policies that govern the services that those resources servers provide. Such policies can indicate the various levels of resource access (e.g., read quotas, write quotas, delete quotas, etc.) that should be granted to various different user roles. Resource servers can be dedicated to specific identity domains, in which case they can maintain authorization policies applicable only to a single identity domain, or resource servers can be multi-tenant-aware servers that maintain separate sets of authorization policies that are applicable to different identity domains.

As is discussed above, in an embodiment of the invention, a single OAuth authorization server maintains multiple separate OAuth service profiles—one per identity domain. In an embodiment of the invention, the OAuth service profile for a particular identity domain binds client applications to resource servers, thereby indicating, for each client application, the resource servers that the client application is permitted to access; some client applications might not be permitted to access some resources servers. Such application-to-server bindings specified within one OAuth service profile data might differ from application-to-server bindings specified within another OAuth service profile, so that separate instances of a particular client application executing in the context of different identity domains might not have access to the same resource servers.

According to one embodiment, multiple separate OAuth service profiles can be generated and associated with a same identity domain. For example, a human resources (HR) OAuth service profile might indicate that HR client applications are permitted to access only HR resource servers in a particular tenant's identity domain, while a marketing OAuth service profile might indicate that marketing client applications are permitted to access only marketing resource servers in that same particular tenant's identity domain.

In an embodiment, the cloud-wide OAuth authorization server consults the bindings specified within a particular OAuth service profile in response to receiving a token request from a client application. For example, the OAuth authorization server can consult the bindings specified with the OAuth service profile that is associated with the identity domain in which the client application executes. Based on the bindings, the OAuth authorization server determines whether that client application is even allowed to communicate with the resource server to which the requested token pertains. If the particular OAuth service profile indicates that the client application is not bound to the resource server, then the client application's request is denied without any interaction with the resource server.

Alternatively, if the particular OAuth service profile indicates that the client application is bound to the resource server, then the OAuth authorization server determines, from the particular OAuth service profile, a callback URL for the resource server. The OAuth authorization server uses this URL to send, to the resource server, an inquiry regarding the scope of access (e.g., quotas) that the client application and/or user is permitted to have relative to the requested resource. In response to such an inquiry, the resource server can determine, by applying its authorization policies to the parameters of the request (e.g., client application identity, user identity, resource identity), the scope of access that should be granted, if any. The resource server can reply to the OAuth authorization server with this scope of access information. Alternatively, the OAuth authorization server can obtain the resource server's authorization policies from the resource server, store a copy locally, and can apply those policies itself to determine the scope of access that should be granted. The OAuth authorization server can generate an appropriate token based on the scope of access information determined, and can provide this token to the client application in response to the client application's token request. The client application can thereafter present the token to the resource server when seeking access to services that the resource server provides. The resource server can restrict the client application's access to its services based on the scope of access information contained within the token.

Figure 4:
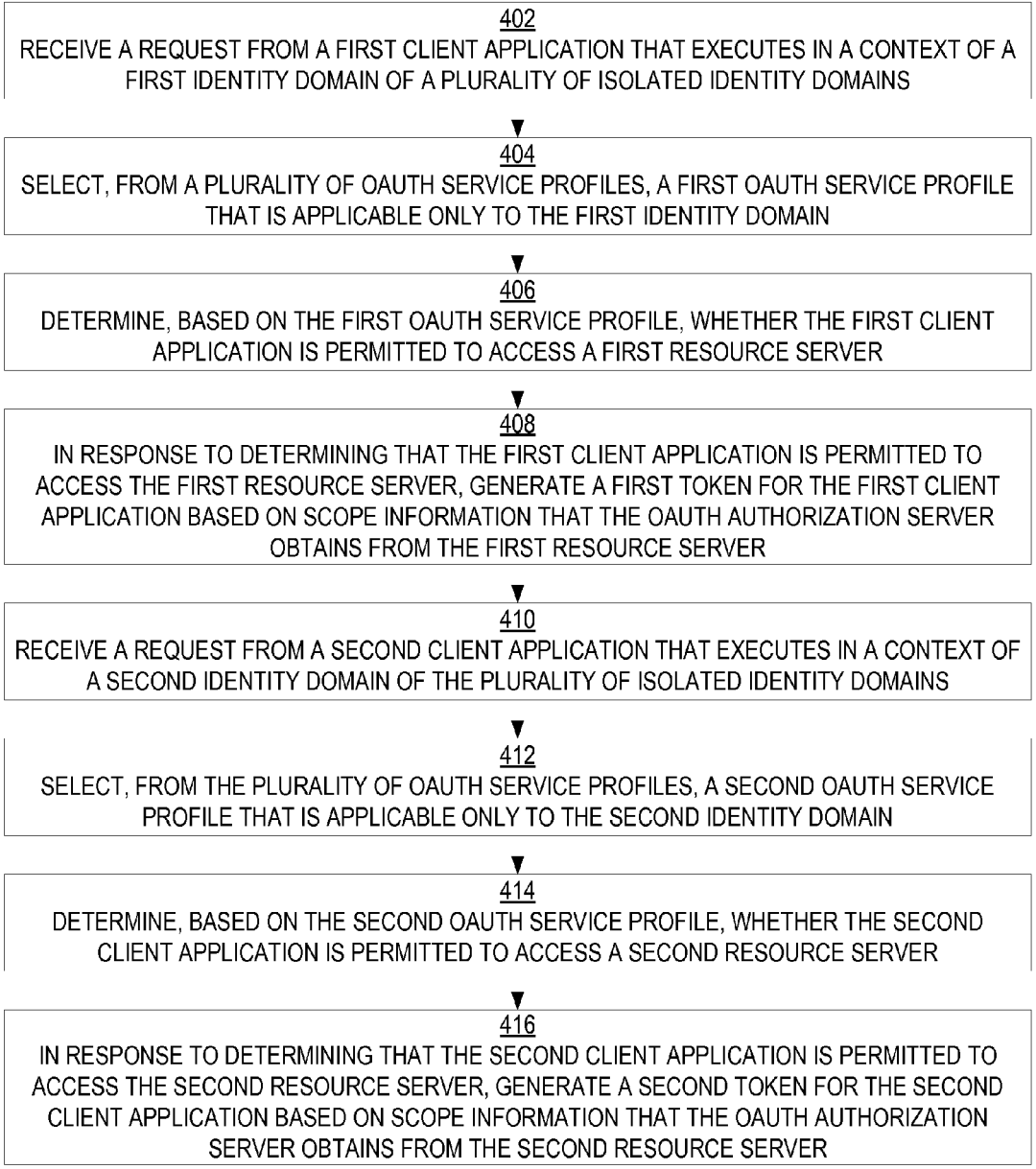
FIG. 4 is a flow diagram that illustrates an example of a technique that an OAuth authorization server in a multi-identity domain cloud-based computing environment can use to generate authorization tokens for different applications executing in the context of separate isolated identity domains, according to an embodiment of the invention.

FIG. 4 is a flow diagram that illustrates an example of a technique that an OAuth authorization server in a multi-identity domain cloud-based computing environment can use to generate authorization tokens for different applications executing in the context of separate isolated identity domains, according to an embodiment of the invention. In block 402, an OAuth authorization server receives a request from a first client application that executes in a context of a first identity domain of a plurality of isolated identity domains. In block 404, the OAuth authorization server selects, from a plurality of OAuth service profiles that the OAuth authorization server maintains, a first OAuth service profile that is applicable only to the first identity domain. In block 406, the OAuth authorization server determines, based on the first OAuth service profile, whether the first client application is permitted to access a first resource server. In block 408, the OAuth authorization server generates, in response to determining that the first client application is permitted to access the first resource server, a first token for the first client application based on scope information that the OAuth authorization server obtains from the first resource server. In block 410, the OAuth authorization server receives a request from a second client application that executes in a context of a second identity domain of the plurality of isolated identity domains. The second identity domain is separate from the first identity domain. In block 412, the OAuth authorization server selects, from the plurality of OAuth service profiles that the OAuth authorization server maintains, a second OAuth service profile that is applicable only to the second identity domain. In block 414, the OAuth authorization server determines, based on the second OAuth service profile, whether the second client application is permitted to access a second resource server. In block 416, the OAuth authorization server generates, in response to determining that the second client application is permitted to access the second resource server, a second token for the second client application based on scope information that the OAuth authorization server obtains from the second resource server.

Figure 5:
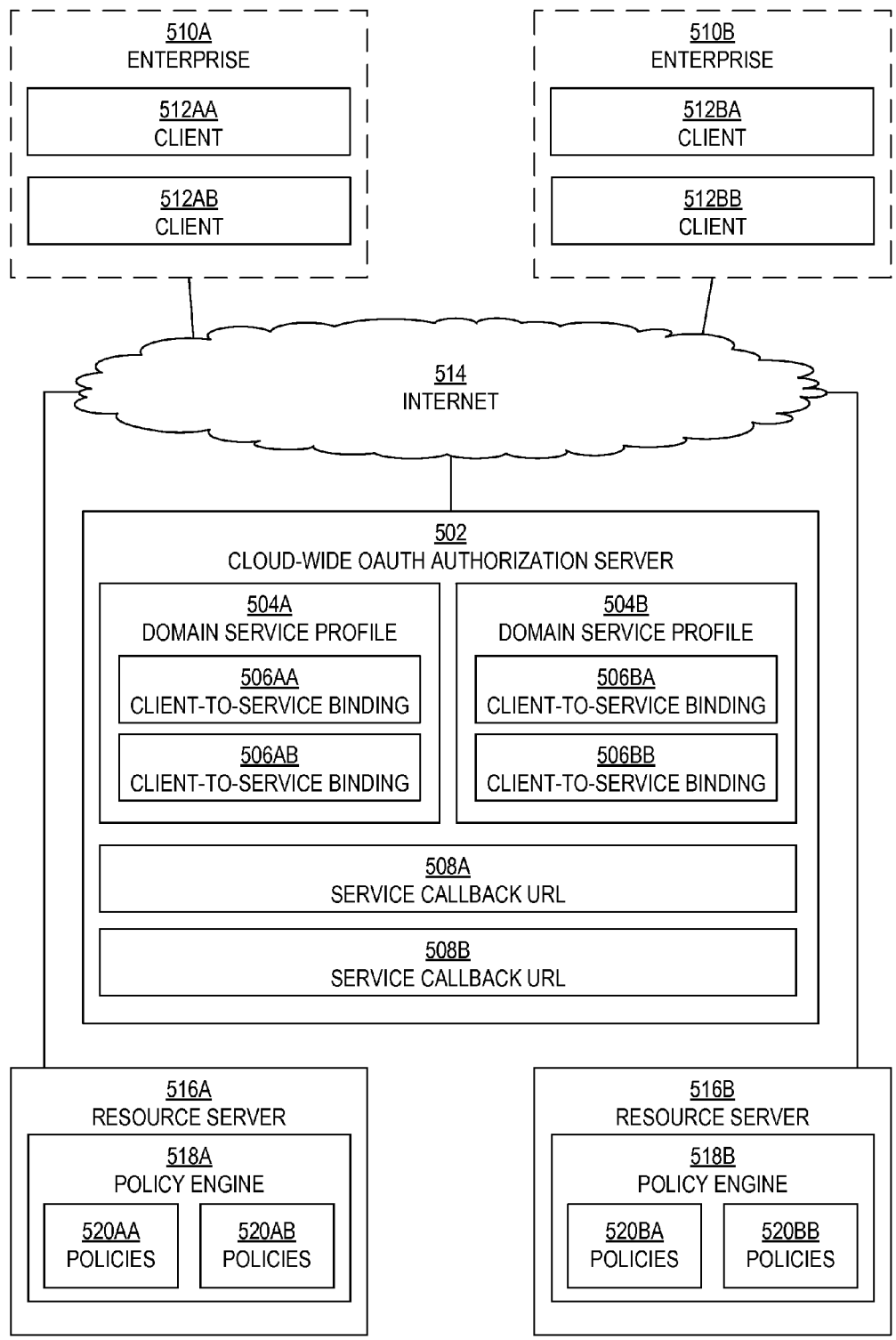
FIG. 5 is a block diagram that illustrates an example of a cloud-wide OAuth authorization server that interacts with clients from separate enterprises, having different identity domains, in order to authorize those clients relative to cloud-provided services, according to an embodiment of the invention.

FIG. 5 is a block diagram that illustrates an example of a cloud-wide OAuth authorization server that interacts with clients from separate enterprises, having different identity domains, in order to authorize those clients relative to cloud-provided services, according to an embodiment of the invention. FIG. 5 shows separate enterprises 510A and 510B. Enterprises 510A and 510B can be different and unrelated business organizations. Each of enterprises 510A and 510B can be a separate customer of the cloud computing service discussed herein. Enterprise 510A includes multiple clients, such as clients 512AA and clients 512AB. Clients 512AA and 512AB can be associated with and operated by different users within enterprise 510A. Each of these users can have a separate identity that is contained within an identity domain that is uniquely associated with enterprise 510A. Each of these users can be associated with a separate defined role in a hierarchy of defined roles that can be unique to enterprise 510A. Enterprise 510B also includes multiple clients, such as clients 512BA and clients 512BB. Clients 512BA and 512BB can be associated with and operated by different users within enterprise 510B. Each of these users can have a separate identity that is contained within an identity domain that is uniquely associated with enterprise 510B. Each of these users can be associated with a separate defined role in a hierarchy of defined roles that can be unique to enterprise 510B.

Clients 512AA, 512AB, 512BA, and 512BB each can interact with a cloud-wide OAuth authorization server 502 that serves all clients of the cloud computing environment regardless of the enterprises or identity domains to which those clients belong. Each of clients 512AA, 512AB, 512BA, and 512BB can send, through Internet 514, to cloud-wide OAuth server 502, an authorization token request that specifies (a) credentials for the user of that client, and (b) a cloud-based service that the client desires to access. Cloud-wide OAuth authorization server 502 receives such authorization token requests through Internet 514. For each such authorization token request, Cloud-wide OAuth authorization server 502 can determine an identity domain that is associated with the client from which that authorization token request originated. For example, cloud-wide OAuth authorization server 502 can determine, based on stored mapping data, that clients 512AA and 512AB (and their associated users) belong to enterprise 510A and therefore to a first identity domain that corresponds uniquely to enterprise 510A. Continuing the example, cloud-wide OAuth authorization server 502 can determine, based on stored mapping data, that clients 512BA and 512BB (and their associated users) belong to enterprise 510B and therefore to a second identity domain that corresponds uniquely to enterprise 510B.

In an embodiment, cloud-wide OAuth authorization server 502 stores multiple different domain service profiles, such as domain service profile 504A and domain service profile 504B. Each such domain service profile can be uniquely associated with a separate identity domain. Upon determining the particular identity domain to which a particular client (and its associated user) belongs, cloud-wide OAuth authorization server 502 can determine which of several separate domain service profiles stored by server 502 corresponds uniquely to that particular identity domain. For example, in response to determining that clients 512AA and 512AB are associated with a first identity domain (e.g., that owned by enterprise 510A), cloud-wide OAuth authorization server 502 can determine that domain service profile 504A, which is associated uniquely with the first identity domain, is to be used to process authorization token requests originating from clients 512AA and 512AB. For example, in response to determining that clients 512BA and 512BB are associated with a second identity domain (e.g., that owned by enterprise 510B), cloud-wide OAuth authorization server 502 can determine that domain service profile 504B, which is associated uniquely with the first identity domain, is to be used to process authorization token requests originating from clients 512AA and 512AB.

In an embodiment, each of domain service profiles 504A and 504B contains a separate set of client-to-service bindings. Each client-to-service binding can specify whether a particular client has any access (of any scope) to a particular service (provided by a particular resource server). For example, domain service profile 504A can contain client-to-service bindings 506AA and 506AB, while domain service profile 504B can contain client-to-service bindings 506BA and 506BB. In this example, client-to-service binding 506AA indicates that client 512AA is allowed to access a service provided by resource server 516A; client-to-service binding 506AA indicates that client 512AB is allowed to access a service provided by resource server 516B; client-to-service binding 506BA indicates that client 512BA is allowed to access a service provided by resource server 516A; and client-to-service binding 506AA indicates that client 512AB is allowed to access a service provided by resource server 516B.

In one embodiment, the absence of a binding between a particular client and a particular service is conclusive evidence that the particular client is not permitted to access the particular service at all, while in another embodiment, a binding can expressly specify whether or not the particular client is permitted to access the particular service. In an embodiment, in response to determining that a particular client is not permitted to access the service specified within the particular client's authorization token request, cloud-wide OAuth authorization server 502 can return, to the particular client, through Internet 514, an indication that the authorization token request is denied. In one embodiment, client-to-service bindings are created in response to a tenant (such as enterprises 510A and 510B) purchasing a subscription to the services specified in those bindings and subsequently having those services provisioned to that tenant's identity domain. Thus, in such an embodiment, if a particular tenant has not purchased or otherwise obtained a subscription to a particular service, then there will be no client-to-service bindings between that particular tenant's clients (or users thereof) and that particular service.

In an embodiment, cloud-wide OAuth authorization server 502 additionally stores a separate service callback URL for each resource server that provides a service in the cloud computing environment. In the example illustrated, cloud-wide OAuth authorization server 502 stores service callback URL 508A for resource server 516A and service callback URL 508B for resource server 516B. In response to locating, in the domain service profile for the identity domain to which a particular client belongs, a particular client-to-service binding that specifies both the client (or user thereof) and the service specified within an authorization token request, cloud-wide OAuth authorization server 502 determines the service callback URL for the particular resource server that provides that service. Cloud-wide OAuth authorization server 502 then forwards the authorization token request over Internet 514 to the resource server having that service callback URL. Domain name servers and routers within Internet 514 use the service callback URL to route the authorization token request to the proper resource server within the cloud computing environment.

In an embodiment, each of resource servers 516A and 516B contains or executes a policy engine. For example, resource server 516A can execute policy engine 518A, while resource server 516B can execute policy engine 518B. Each of policy engines 518A and 518B can be a separate executing instance of the same policy engine code. Each of policy engines 518A and 518B can contain or can access multiple sets of policies. Each set of policies can pertain to a separate identity domain. For example, policy engine 518A can access policies 520AA, which pertain to the first identity domain (i.e., of enterprise 510A) and/or policies 520AB, which pertain to the second identity domain (i.e., of enterprise 510B). Similarly, policy engine 518B can access policies 520BA, which pertain to the first identity domain (i.e., of enterprise 510A) and/or policies 520BB, which pertain to the second identity domain (i.e., of enterprise 510B). The policies for each resource server can differ from each other. The policies for different identity domains can differ from each other even relative to the same resource server. Thus, the policies governing clients 512AA and 512AB relative to resource server 516A can differ from the policies governing clients 512BA and 512BB relative to resource server 516A. Likewise, the policies governing clients 512AA and 512AB relative to resource server 516B can differ from the policies governing clients 512BA and 512BB relative to resource server 516B.

In response to receiving an authorization token request that cloud-wide OAuth authorization server 502 forwarded through Internet 514, the recipient resource server can invoke its policy engine to determine a particular set of policies that applies to the identity domain of the particular client (or user) specified in that authorization token request. For example, in response to receiving an authorization token request specifying client 512AA or client 512AB, policy engine 518A can determine that policies 520AA pertain to that authorization token request. In response to receiving an authorization token request specifying client 512BA or client 512BB, policy engine 518A can determine that policies 520AB pertain to that authorization token request. Continuing the example, in response to receiving an authorization token request specifying client 512AA or client 512AB, policy engine 518B can determine that policies 520BA pertain to that authorization token request. In response to receiving an authorization token request specifying client 512BA or client 512BB, policy engine 520B can determine that policies 520BB pertain to that authorization token request.

In an embodiment, a particular policy engine has access to the user identity store of each tenant that subscribes to a service that is provided by the resource server that executes that particular policy engine. Thus, the policy engine can obtain, from the user identity store, the attributes of the client or user specified in the authorization token request. The policy engine can then select, from the set of policies determined to be pertinent to the authorization token request, policies that are applicable to the service specified in the authorization token request. These selected policies can specify various scopes of access relative to various client or user attributes. The policy engine can evaluate the selected policies relative to the attributes that are associated with the identity read from the user identity store. As a result of the evaluation, the policy engine can determine a scope of access (e.g., which operations are permissible relative to which resources) that the requesting client (and its user) are permitted when utilizing the service specified in the authorization token request. Through Internet 514, the resource server that invoked the policy engine can return, to cloud-wide OAuth authorization server 502, an indication of the permitted scope of access for the client (or user thereof) identified in the authorization token request. For example, policy engine 518A may determine, based on some of policies 520AA, that client 512AA has a first scope of access relative to services provided by resource server 516A, while client 512AB has a second scope of access relative to services provided by resource server 516A. Policy engine 518A may determine, based on some of policies 520AB, that client 512BA has a third scope of access relative to services provided by resource server 516A, while client 512BB has a fourth scope of access relative to services provided by resource server 516A. Continuing the example, policy engine 518B may determine, based on some of policies 520BA, that client 512AA has a fifth scope of access relative to services provided by resource server 516B, while client 512AB has a sixth scope of access relative to services provided by resource server 516B. Policy engine 518B may determine, based on some of policies 520BB, that client 512BA has a seventh scope of access relative to services provided by resource server 516B, while client 512BB has an eighth scope of access relative to services provided by resource server 516B. The first through eighth scopes of access referenced in the foregoing example all may differ from each other.

Cloud-wide OAuth authorization server 502 can receive, over Internet 514, from resource servers 516A and 516B, indications of scopes of access that pertain to various authorization token requests that server 502 forwarded to those resource servers. In response to receiving such indications of scopes of access, Cloud-wide OAuth authorization server 502 can generate authorization tokens that specify that certain clients or users have the corresponding scopes of access relative to services provided by the resource servers from which those scopes of access were received. Cloud-wide OAuth authorization server 502 can return, over Internet 514, such authorization tokens back to the various clients 512AA, 512AB, 512BA, and 512BB from which server 502 previously received the corresponding authorization token requests. Clients 512AA, 512AB, 512BA, and 512BB receive these tokens over Internet 514 and thereafter can present these authorization tokens to resource servers 516A and 516B when requesting services from those resource servers. Resource servers 516A and 516B can inspect the scopes of access contained within those authorization tokens in order to determine whether the requesting client is permitted to utilize a service to perform a specified operation relative to a specified resource.

In an embodiment described above, resource servers 516A and 516B execute policy engines 516A and 516B, respectively, and return indications of scopes of access to cloud-wide OAuth authorization server 502, which generates authorization token based on those scopes. However, in an alternative embodiment of the invention, instead of returning indications of scopes of access to cloud-wide OAuth authorization server 502, resource servers 516A and 516B can register, with server 502, the actual policies (e.g., policies 520AA and 520AB for resource server 516A, and policies 520BA and 520BB for resource server 516B) that are applicable to each identity domain. In such an alternative embodiment of the invention, cloud-wide OAuth authorization server 502 itself can evaluate the policies in the applicable subset against the client's (or user's) attributes obtained from a cloud-wide identity store. Thus, in such an alternative embodiment, cloud-wide OAuth authorization server 502 itself can determine, based on the result of the evaluation, the scope of access that is to be specified in the authorization token to be returned to the request-originating client. In such an alternative embodiment, cloud-wide OAuth authorization server 502 might not need to forward authorization token requests to the resource servers.

Bundled Authorization Requests

Typically, a client application requesting services on behalf of a particular user will end up requesting access to multiple different services for that user. For example, the client application might end up requesting access to a storage service, a document service, and a messaging service. These services might be offered by different resource servers. Without enhancement, the client application might end up making three separate token requests to the OAuth authorization server. This can be the case even if the client application has some foreknowledge that eventually all three services will be requested on behalf of the particular user.

In one embodiment of the invention, to avoid such an inefficient process, a client application can bundle multiple access requests for separate services—offered by separate resource servers—into a single token request that the client application issues to the OAuth authorization server. In response to such a bundled request, the OAuth authorization server can obtain authorization decisions from each of the resource servers that provide the services requested. The OAuth authorization server can then generate a single token that includes access scope information resulting from each such resource server's authorization decision. The OAuth authorization server can return this single token to the client application. The client application can then supply this token to any of the resource servers that provide any of the services requested in the bundled request.

Figure 7:
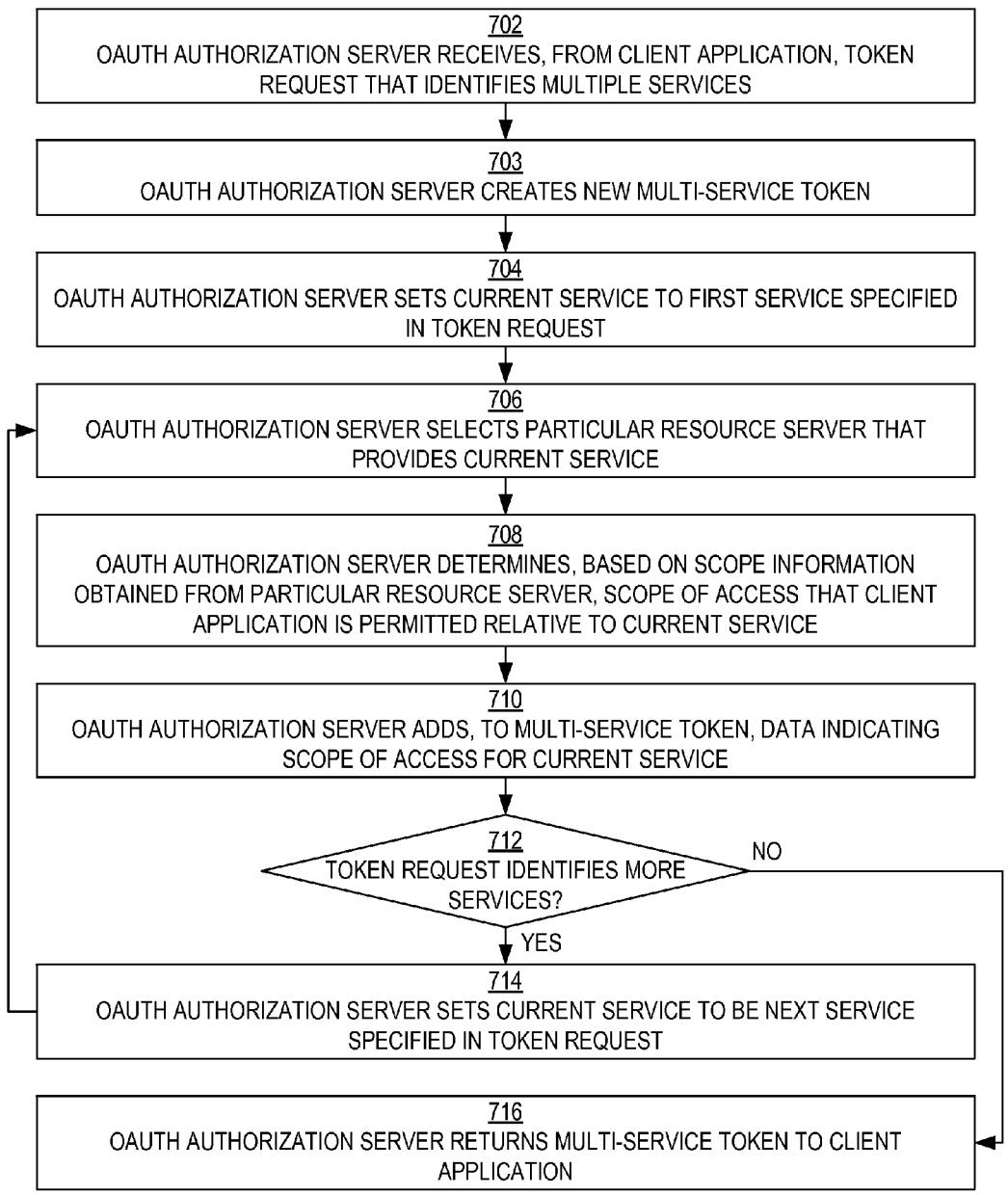
FIG. 7 is a flow diagram that illustrates an example of a technique for generating a single token usable to request services from multiple resource servers, according to an embodiment of the invention.

FIG. 7 is a flow diagram that illustrates an example of a technique for generating a single token usable to request services from multiple resource servers, according to an embodiment of the invention. In block 702, an OAuth authorization server receives, from a client application, a token request that identifies multiple services. In block 703, in response to receiving the token request, the OAuth authorization server creates a new multi-service token. In block 704, the OAuth authorization server sets the current service to be the first service specified in the token request. In block 706, the OAuth authorization server selects, from a group of resource servers, a particular resource server that provides the current service. In block 708, the OAuth authorization server determines, based on scope information obtained from the particular resource server, a scope of access that the client application is permitted to have relative to the current service. In block 710, the OAuth authorization server adds, to the multi-service token, data indicating the scope of access for the current service. In block 712, the OAuth authorization server determines whether the token request identifies any further services for which access scope data has not yet been added to the multi-service token. If so, then control passes to block 714. Otherwise, control passes to block 716.

In block 714, the OAuth authorization server sets the current service to be the next service specified in the token request. Control passes back to block 706.

Alternatively, in block 716, the OAuth authorization server returns the multi-service token to the client application. The technique described with reference to FIG. 7 then concludes.

Pluggable Authorization Policies

In one embodiment, the OAuth authorization server does not need to make decisions as to access scope for services that are provided by resource servers. In such an embodiment, the resource servers make these decisions instead based on their own maintained authorization policies, and the OAuth authorization server generates a token that specifies access scope determined based on these decisions. The OAuth authorization server can make callbacks to resource servers in order to determine access scope. As a result, tenants can "plug in" desired authorization policies to the OAuth authorization system by configuring those authorization policies within the resource servers deployed to their identity domains.

Figure 8A:
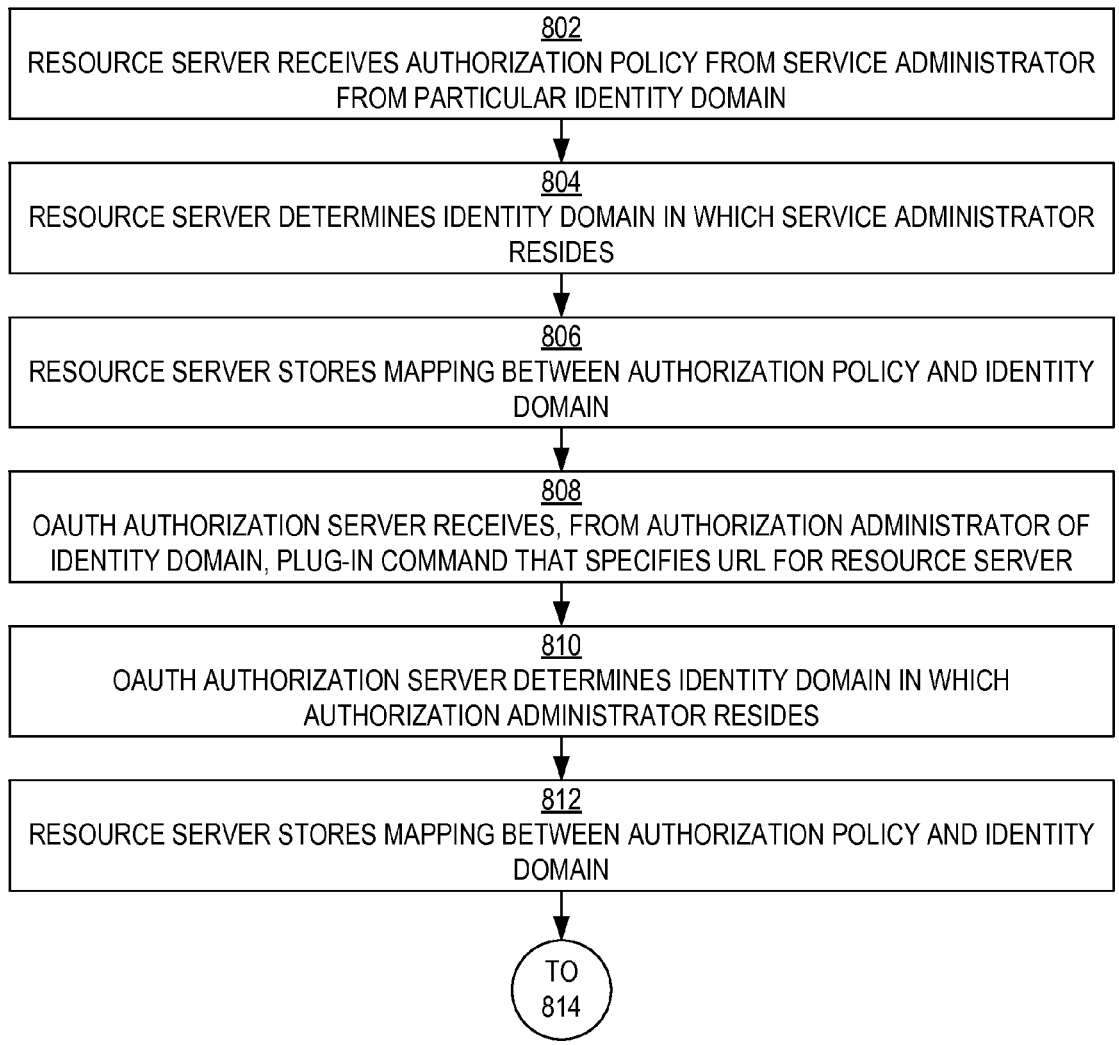
FIGS. 8A-B show a flow diagram that illustrates an example of a technique for plugging in resource server-maintained authorization policies to an OAuth authorization server, according to an embodiment of the invention.
Figure 8B:
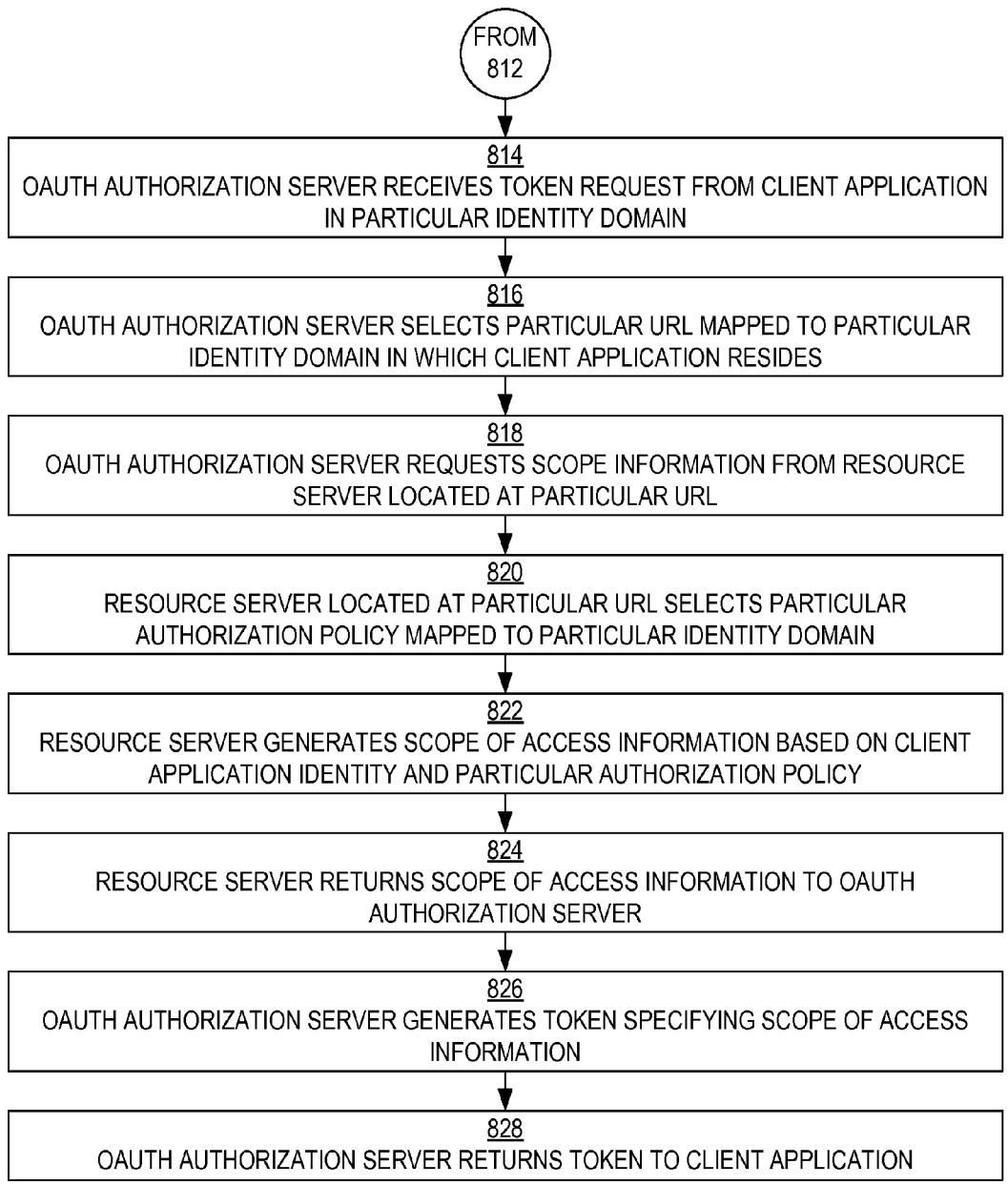

FIGS. 8A-B show a flow diagram that illustrates an example of a technique for plugging in resource server-maintained authorization policies to an OAuth authorization server, according to an embodiment of the invention. Referring first to FIG. 8A, in block 802, a resource server receives an authorization policy from a service administrator from a particular identity domain. The resource server may have different service administrators for different identity domains. In block 804, in response to receiving the authorization policy, the resource server determines the identity domain in which the service administrator resides. In block 806, the resource server stores a mapping between the authorization policy and the identity domain. In block 808, an OAuth authorization server receives, from the authorization administrator of the identity domain, a plug-in command that specifies a URL for the resource server. In block 810, in response to receiving the plug-in command, the OAuth authorization server determines an identity domain in which the authorization administrator resides. In block 812, the OAuth authorization server stores a mapping between the identity domain and the URL for the resource server.

Referring next to FIG. 8B, in block 814, the OAuth authorization server receives a token request from a client application in a particular identity domain. In block 816, in response to receiving the token request, the OAuth authorization server selects, from potentially multiple different URLs, a particular URL that is mapped to the particular identity domain in which the client application resides. In block 818, the OAuth authorization server requests scope information from the resource server located at the particular URL. The request may indicate the particular identity domain and the client application. In block 820, the resource server located at the particular URL selects, from potentially multiple different authorization policies, a particular authorization policy that is mapped to the particular identity domain. In block 822, the resource server generates scope of access information based on the identity of the client application and the particular authorization policy. The scope of access information indicates the scope of access (e.g., permitted and forbidden operations) that the client application has relative to the services provided by the resource server. In block 824, the resource server returns the scope of access information to the OAuth authorization server. In block 826, the OAuth authorization server generates a token that specifies the scope of access information. In block 828, the OAuth authorization server returns the token to the client application.

Extended OAuth Request Format and Custom Token Attributes

In an embodiment, a token request can include data items that are not a part of the standard OAuth specification; the token request format can be extended beyond the standard to enhance the OAuth authorization system capabilities. For example, the token request can include attribute values pertaining to the human user on whose behalf the client application is requesting a token from the OAuth authorization server. A resource server might benefit from obtaining such user attribute values in order to decide access scope on the basis of those attribute values. Thus, extending the information that can be included in the token request can enable resource servers to make more sophisticated access scope decisions. The authorization policies that are maintained by the resource servers can specify more sophisticated criteria that involve attributes that otherwise would not be considered because they otherwise would not be available to the resource server. Instead of being limited to criteria related to client application attributes, authorization policies can specify criteria related to human user attributes. These human user attributes can be maintained in an LDAP-based identity store that is partitioned by identity domain.

In one embodiment, an OAuth authorization server can insert user attributes into a token. The OAuth authorization server can fetch such user attributes from a user profile that can be stored in an LDAP directory. The OAuth authorization server can send the token, including the user attributes, to a client application so that the client application can present that token to a resource server. The resource server can make policy decisions based at least in part on the user attributes included in the token. For example, a resource server might need to know a user's subscription identifier in order to make an authorization decision. The subscription identifier might be stored in the user's profile. At the time of generating the token, the OAuth authorization server can read the user's profile information from a directory. The OAuth authorization server can read the subscription identifier from the user's profile information.

In one embodiment, the OAuth authorization server determines, based on an OAuth administrator-defined configuration, which kinds of external information, such as user attributes, need to be inserted into each token that the OAuth authorization server generates. The OAuth authorization server obtains and inserts the designated information into each token that the server generates. The OAuth authorization server can obtain information from any service and can insert that information into a token; user attribute information is merely one kind of information that can be obtained and inserted. The OAuth authorization server can obtain such information from sources other than LDAP directories also. For example, the OAuth authorization server can obtain such information from web services or other executing programs.

Figure 6:
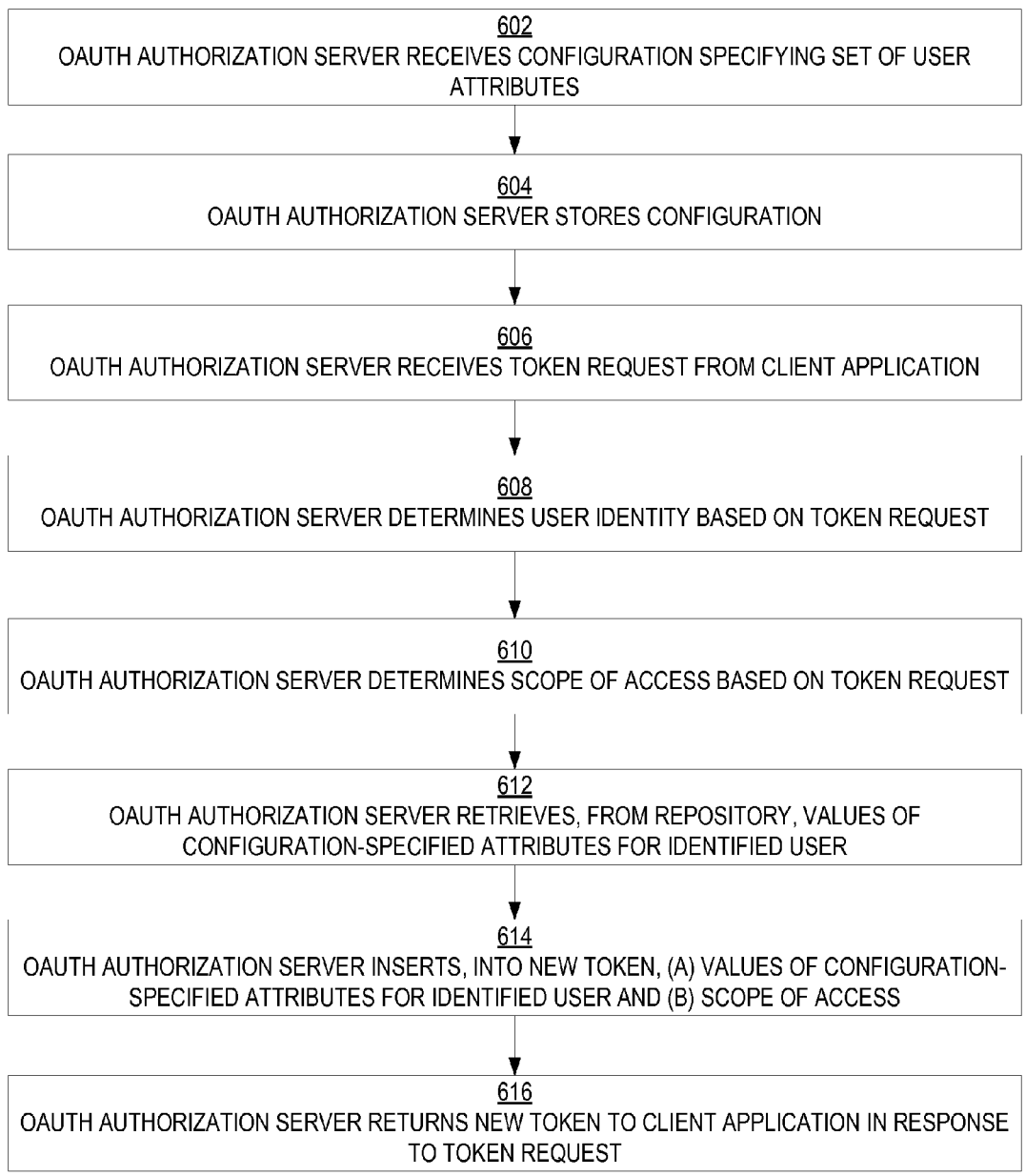
FIG. 6 is a flow diagram that illustrates an example of a technique for augmenting a token with user-specific attributes, according to an embodiment of the invention.

FIG. 6 is a flow diagram that illustrates an example of a technique for augmenting a token with user-specific attributes, according to an embodiment of the invention. In block 602, an OAuth authorization server receives an administrator-defined configuration that specifies a set of user attributes. For example, the set of user attributes might include: department, security level, etc. It should be noted that these are the names of the attributes rather than the specific values thereof. In block 604, the OAuth authorization server stores the administrator-defined configuration. In block 606, the OAuth authorization server receives a token request from a client application. In block 608, the OAuth authorization server determines an identity of a user based on the token request. In block 610, the OAuth authorization server determines a scope of access based on the token request. For example, the OAuth authorization server can use techniques described above to determine the scope of access based on resource server-provided authorization policies. In block 612, the OAuth authorization retrieves, from a repository, values of the configuration-specified attributes for the identified user. In block 614, the OAuth authorization server inserts, into a new token, both (a) the values of the configuration-specified attributes for the identified user and (b) the scope of access. In block 616, the OAuth authorization server returns the new token to the client application in response to the token request. Thereafter, authorization decisions can be made based at least in part on the values of the user attributes specified in the token that the client application supplies with each request to access a resource provided by a resource server.

Client Plug-Ins Permitting Diverse Client Profile Repositories

Each tenant in the cloud computing environment can have multiple client applications deployed to its separate identity domain. Each such client application can have a client profile. Some tenants might want to store client profiles in an LDAP directory. Other tenants might want to store client profiles in a configuration file. Yet other tenants might want to store client profiles in a database. In one embodiment of the invention, the OAuth authorization server provides a pluggable implementation for clients. The repositories into which a tenant's client profiles are stored can be configured on a per-tenant basis.

When a client application makes a request, the client supplies, to the OAuth authorization server, an identifier and a password that can be used to authenticate that client application prior to the performance of authorization procedures. The OAuth authorization server can relay the client application's identifier and password to the appropriate plug-in so that the client application can be authenticated. The plug-in can access the repository in which the client application's profile is stored, regardless of the form that the repository takes. In one embodiment, for each identity domain, the OAuth authorization server stores configuration information that indicates the location of the plug-in that can access the client profiles for that identity domain. The OAuth authorization server can relay authorization requests to the appropriate plug-in based on this configuration information.

Figure 9:
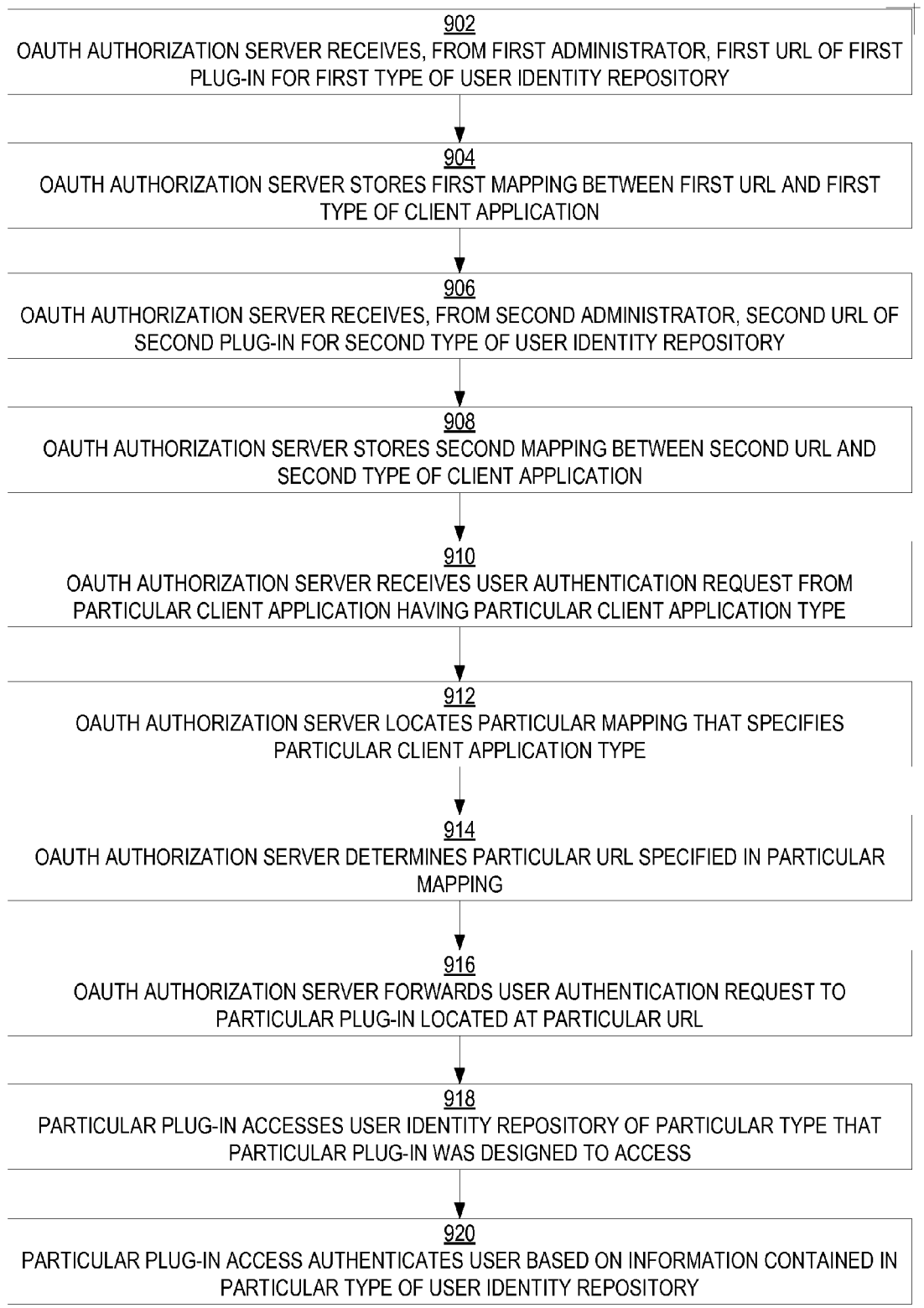
FIG. 9 is a flow diagram that illustrates an example of a technique for routing an authentication request to a client-specific plug-in module that accesses a client-specific user identity repository, according to an embodiment of the invention.

FIG. 9 is a flow diagram that illustrates an example of a technique for routing an authentication request to a client-specific plug-in module that accesses a client-specific user identity repository, according to an embodiment of the invention. In block 902, an OAuth authorization server receives, from a first administrator, a first URL of a first plug-in for a first type of user identity repository. For example, the first type of user identity repository might be a relational database. The OAuth authorization server may also receive, from the first administrator, information specifying a first type of client application that the first plug-in is supposed to service. In block 904, the OAuth authorization server stores a first mapping between the first type of client application and the first URL. Thus, the first plug-in becomes registered with the OAuth authorization server. In block 906, the OAuth authorization server receives, from a second administrator, a second URL of a second plug-in for a second type of user identity repository. For example, the second type of user identity repository might be an LDAP directory. The OAuth authorization server may also receive, from the second administrator, information specifying a second type of client application that the second plug-in is supposed to service. In block 908, the OAuth authorization server stores a second mapping between the second type of client application and the second URL. Thus, the second plug-in becomes registered with the OAuth authorization server.

In block 910, the OAuth authorization server receives a user authentication request from a particular client application having a particular client application type. The user authentication request may specify a user name and a password. In block 912, the OAuth authorization server locates a particular mapping (e.g., the first mapping or the second mapping) that specifies the particular client application type. In block 914, the OAuth authorization server determines a particular URL (e.g., the first URL or the second URL) that is specified in the particular mapping. In block 916, the OAuth authorization server forwards the user authentication request to a particular plug-in (e.g., the first plug-in or the second plug-in) that is located at the particular URL. In block 918, the particular plug-in accesses the particular type of user identity repository (e.g., the first type of user identity repository or the second type of user identity repository) that the particular plug-in is designed to access. In block 920, the particular plug-in uses the user name and password specified in the forwarded user authentication request to authenticate the user of the particular client application based on information contained in the particular type of user identity repository. In one embodiment, the particular plug-in can inform the OAuth authorization server as to the results of the authentication attempt (success or failure).

Service Profile-Specific Token Attributes

According to an embodiment, attribute values can be defined at an OAuth service profile level. For example, a token time-out value can be defined within an OAuth service profile. An OAuth service profile may indicate that all tokens that are issued to client applications to which that profile applies expire 8 hours after issuance. Thus, when the OAuth authorization server generates tokens for client applications to which that OAuth service profile applies, the OAuth authorization server can generate tokens that expire 8 hours after issuance. Different OAuth service profiles might indicate different values for that same attribute, though, so that tokens that the OAuth authorization server generates for client application in different identity domains might have different time-out values. Such attribute values can be OAuth service profile-specific.

Figure 10:
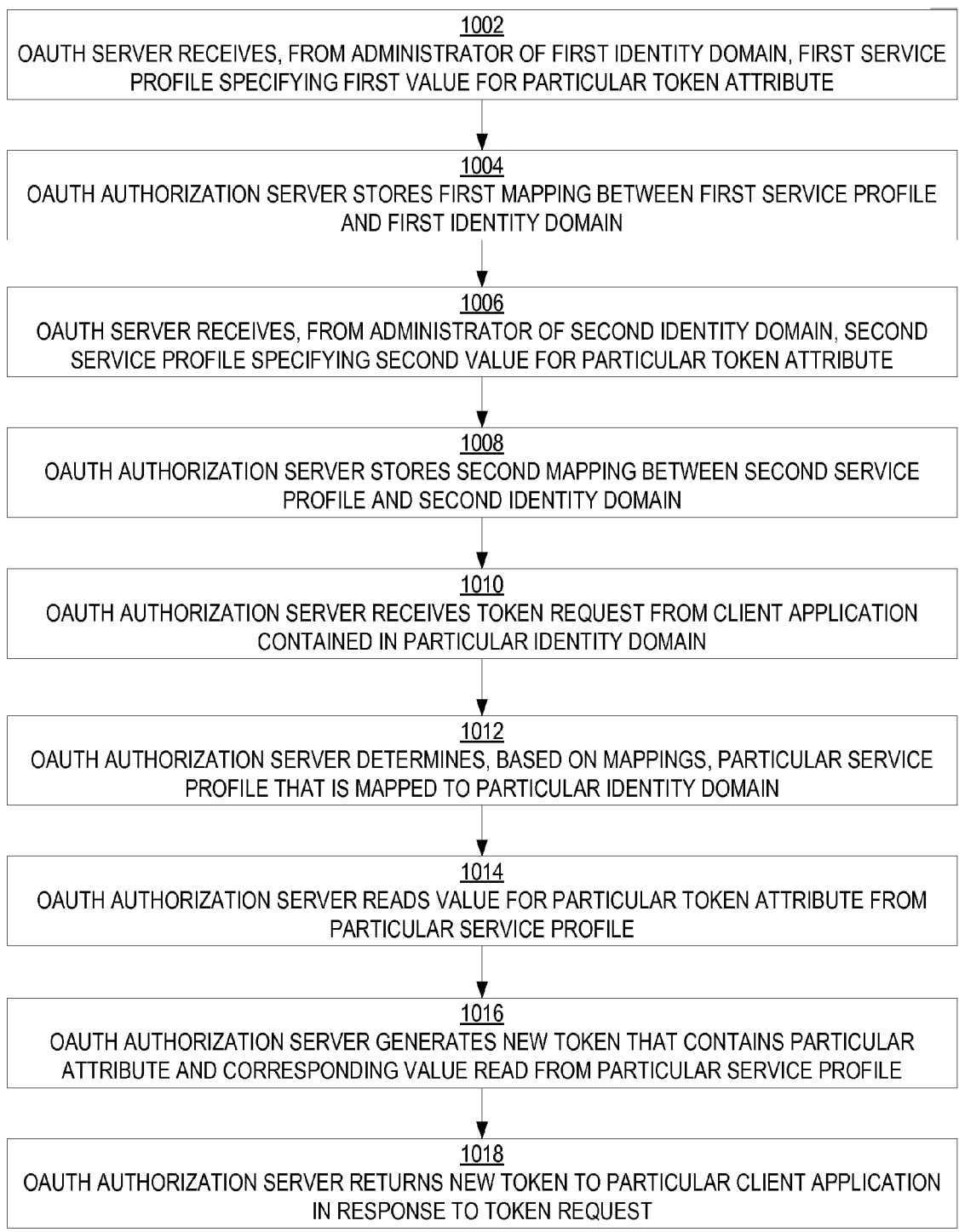
FIG. 10 is a flow diagram that illustrates an example of a technique for generating tokens that have identity domain-specific token attributes, according to an embodiment of the invention.

FIG. 10 is a flow diagram that illustrates an example of a technique for generating tokens that have identity domain-specific token attributes, according to an embodiment of the invention. In block 1002, an OAuth authorization server receives, from an administrator of a first identity domain, a first service profile that specifies a first value for a particular token attribute. For example, the token attribute can be "time-out" and the first value can be "8 hours." In block 1004, in response to receiving the first service profile, the OAuth authorization server stores a first mapping between the first service profile and the first identity domain. In block 1006, the OAuth authorization server receives, from an administrator of a second identity domain, a second service profile that specifies a second value for the particular token attribute. For example, the token attribute can again be "time-out" and the second value can be "1 hour." In block 1008, in response to receiving the second service profile, the OAuth authorization server stores a second mapping between the second service profile and the second identity domain.

In block 1010, the OAuth authorization server receives a token request from a client application that is contained in a particular identity domain. In block 1012, the OAuth authorization server determines, based on the stored mappings, a particular service profile that is mapped to the particular identity domain. In block 1014, the OAuth authorization server reads the value of the particular token attribute from the particular service profile. In block 1016, the OAuth authorization server generates a new token that contains the particular token attribute and the corresponding value from the particular service profile. For example, the new token can indicate the "time-out" attribute and the corresponding value that is specified in the profile that is mapped to the particular client application's identity domain. In block 1018, the OAuth authorization server returns the new token to the particular client application in response to the token request.

Resource Server Token Attribute Overriding

Although a particular OAuth service profile can specify various values for various attributes, such that the OAuth authorization server will generate tokens possessing characteristics conformant to those values for client applications to which the particular OAuth service profile applies, in one embodiment, individual resource servers can override these values for specified attributes. For example, a particular resource server might specify that a time-out attribute value for the services that it provides is to be only 10 minutes, rather than 8 hours. In an embodiment, if a resource server specifies a value for a particular attribute, that value takes precedence over a value specified for the same particular attribute in an OAuth service profile.

Thus, in one embodiment of the invention, resource servers inherit attribute values from OAuth service profiles, but those resource servers can optionally override those inherited attribute values by specifying different resource server-specific attribute values. In such an embodiment, if a resource server does not override the attribute value specified by the applicable OAuth service profile, then the attribute value specified by the OAuth service profile remains valid, and the resource server will communicate that attribute value to the OAuth authorization server as part of the access scope information that the OAuth authorization server uses to generate the token that is returned to the client application.

In one embodiment of the invention, default attribute values also can be defined separately at the identity domain level, such that multiple separate OAuth service profiles within the same identity domain can inherit those attribute values. In such an embodiment, each OAuth service profile can override the attribute values it inherits from the identity domain in the same manner that each resource server can override the attribute values that it inherits from the OAuth service profile.

Figure 11:
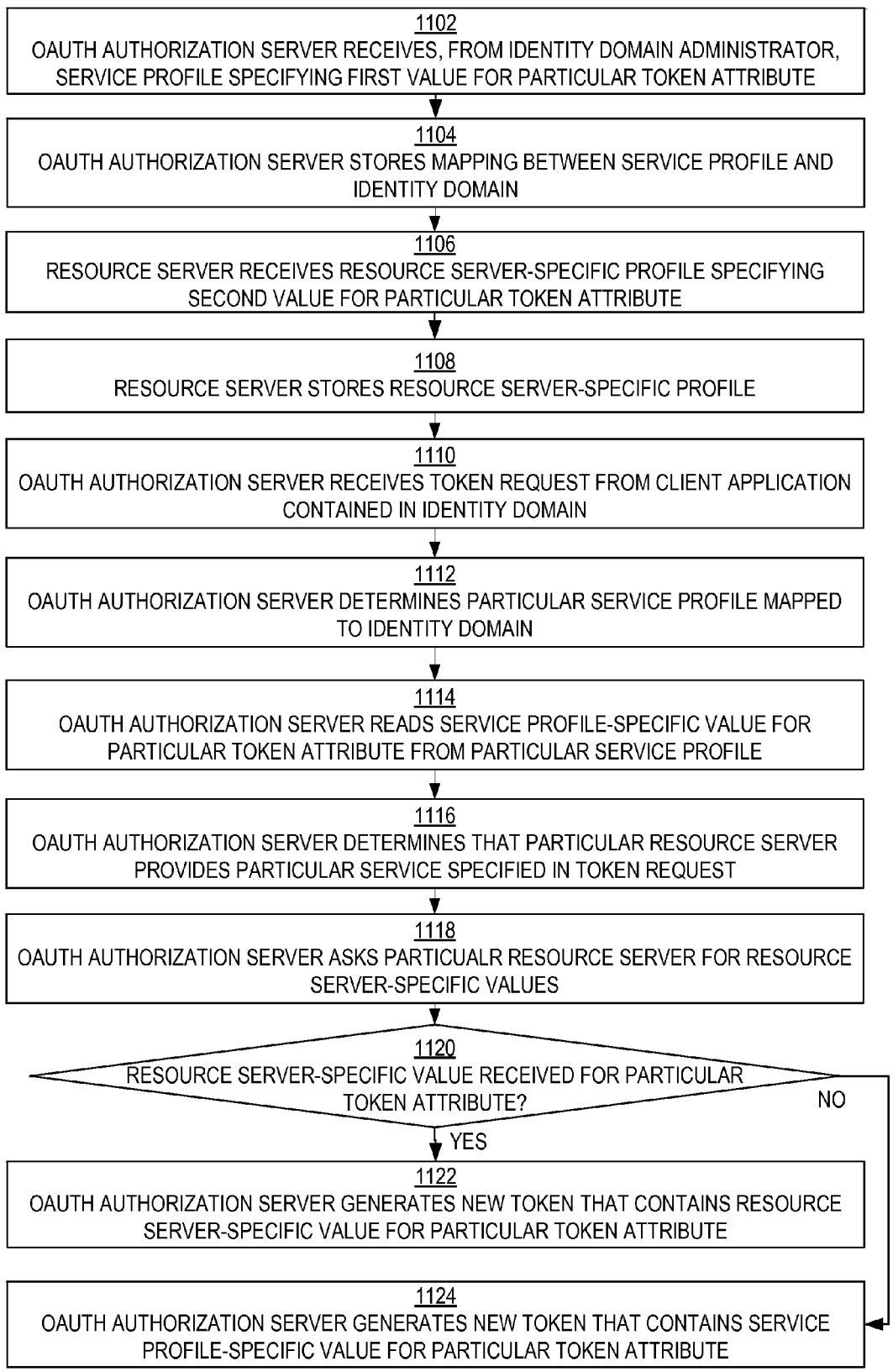
FIG. 11 is a flow diagram that illustrates an example of a technique for generating tokens containing token attributes having values that are overridden by resource servers, according to an embodiment of the invention.

FIG. 11 is a flow diagram that illustrates an example of a technique for generating tokens containing token attributes having values that are overridden by resource servers, according to an embodiment of the invention. In block 1102, an OAuth authorization server receives, from an administrator of an identity domain, a service profile that specifies a first value for a particular token attribute. For example, the token attribute can be "time-out" and the first value can be "8 hours." In block 1104, in response to receiving the service profile, the OAuth authorization server stores a mapping between the service profile and the identity domain. In block 1106, a resource server receives, from an administrator of a resource server, a resource server-specific profile that specifies a second value for the particular token attribute. For example, the token attribute can again be "time-out" and the second value can be "10 minutes." In block 1108, in response to receiving the resource-server specific profile, the resource server stores the resource server-specific profile.

In block 1110, the OAuth authorization server receives a token request from a client application that is contained in the identity domain. In block 1112, the OAuth authorization server determines a particular service profile that is mapped to the identity domain. In block 1114, the OAuth authorization server reads the service profile-specific value for the particular token attribute from the particular service profile. In block 1116, the OAuth authorization server determines that a particular resource server provides the particular service specified in the token request. In block 1118, in response to determining that the particular resource server provides the particular service, the OAuth authorization server asks the particular resource server for resource server-specific values. In block 1120, the OAuth authorization determines whether a particular resource-specific value for the particular attribute was received from the particular resource server. If so, then control passes to block 1122. Otherwise, control passes to block 1124.

In block 1122, the OAuth authorization server generates a new token that contains the particular attribute and the resource server-specific value rather than the service profile-specific value for the particular attribute. In this case, the resource server overrides the service profile's value for the particular attribute. The OAuth authorization server returns the new token to the particular client application in response to the token request.

Alternatively, in block 1124, the OAuth authorization server generates a new token that contains the particular attribute and the service profile-specific value for the particular attribute. In this case, the resource server inherits the service profile's value for the particular attribute. The OAuth authorization server returns the new token to the particular client application in response to the token request.

Configurable Adaptive Access Call-Outs

Sometimes, a tenant might want users defined within its identity domain to be authenticated based on information that is more dynamic that just a static identity and password. For example, a tenant might want its users to be authenticated based on current geographical locations from which those users are seeking access, or the Internet Protocol (IP) address from which those users are seeking access, or the time of day at which those users are seeking access. The use of such dynamic information in order to perform authentication is the basis of adaptive access.

An adaptive access manager can build an access profile for each user over time. For example, the adaptive access manager might determine that a particular user typically logs into the system in between 8 a.m. and 5 p.m. every day. On one particular night, though, the adaptive access manager may determine that the particular user has atypically attempted to log into the system at midnight. This irregular access behavior might indicate an illegitimate access attempt. For another example, the adaptive access manager might determine that a particular user logged in from Boston on one evening and then logged in from San Francisco on the next evening. The great distance between the two locations might indicate an illegitimate access attempt. In response to detecting irregular access behavior, the adaptive access manager might cause an additional challenge to be issued to the user as a part of authentication. For example, in addition to an identity and password, the adaptive access manager might cause a security question to be asked, the answer to which is known only to the true user. For another example, the adaptive access manager might send a single-use code to the user's registered e-mail address and cause the single-use code to be requested in addition to the user's identity and password during authentication. In response to certain access patterns that cannot possibly be legitimate, the adaptive access manager might alternatively block the access attempt entirely, potentially locking the user's account until remedial action can be taken.

In one embodiment of the invention, the OAuth authorization server makes calls to an external adaptive access manager in response to at least certain authentication requests from users. For example, the OAuth authorization server might, based on specified policies, make calls to the adaptive access manager whenever a new user is being registered from a mobile device. The adaptive access manager can respond to the OAuth authorization server with information indicating whether an additional credential (or "second factor") ought to be requested as part of the authentication process. There can be multiple different adaptive access managers. In one embodiment of the invention, each tenant can configure its "slice" of the OAuth authorization server to call a designated adaptive access manager of the tenant's choice. Such a configuration can be specified in a service profile, for example. Thus, a first tenant can cause the OAuth authorization server to make calls to a first adaptive access manager when authenticating its users, while a second tenant can cause the OAuth authorization server to make calls to a second adaptive access manager when authenticating its users. The OAuth authorization server can integrate with adaptive access managers provided by various different vendors.

Figure 12:
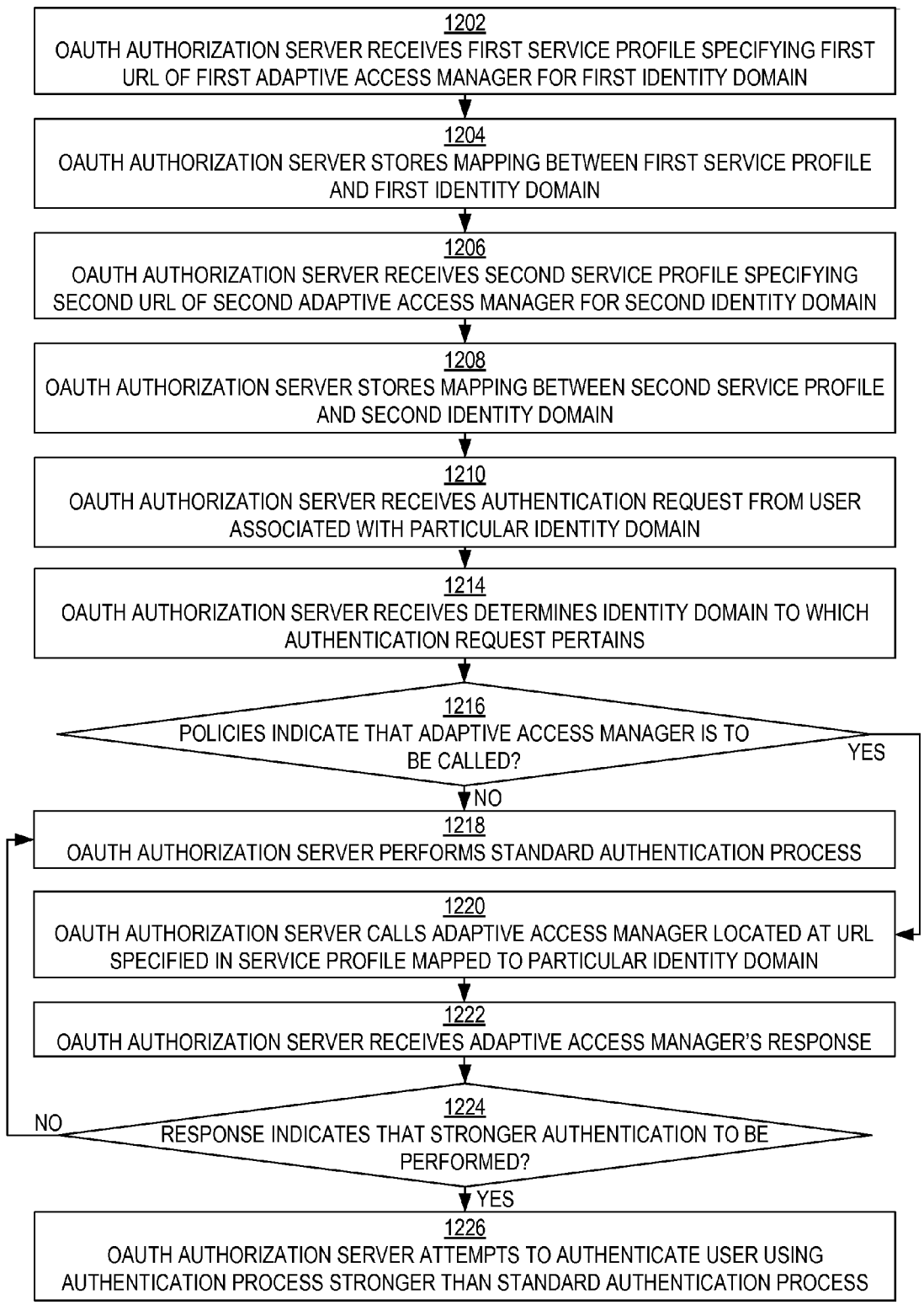
FIG. 12 is a flow diagram that illustrates an example of a technique whereby a shared OAuth authorization server makes calls to different registered adaptive access managers for different identity domains in a cloud computing environments, according to an embodiment of the invention.

FIG. 12 is a flow diagram that illustrates an example of a technique whereby a shared OAuth authorization server makes calls to different registered adaptive access managers for different identity domains in a cloud computing environments, according to an embodiment of the invention. In block 1202, an OAuth authorization server receives, from an administrator of a first identity domain, a first service profile that specifies a first uniform resource locator (URL) for a first adaptive access manager. In block 1204, in response to receiving the first service profile, the OAuth authorization server stores a mapping between the first service profile and the first identity domain. In block 1206, the OAuth authorization server receives, from an administrator of a second identity domain distinct from the first identity domain, a second service profile that specifies a second uniform resource locator (URL) for a second adaptive access manager distinct from the first adaptive access manager. In block 1208, in response to receiving the second service profile, the OAuth authorization server stores a mapping between the second service profile and the second identity domain.

In block 1210, the OAuth authorization server receives an authentication request from a user associated with a particular identity domain. In block 1214, the OAuth authorization server determines an identity domain to which the authentication request pertains. In one embodiment, the authentication request specifies an identity domain. In another embodiment, the OAuth authorization server can consult stored data to determine an identity domain with which the specified user is associated. In block 1216, the OAuth authorization server applies policies to determine whether an adaptive access manager should be called in response to the authentication request. In one embodiment, the policies applied can be identity domain-specific policies, such that the selection of policies applied to the authentication request depends on the identity domain from which the authentication request originated. A policy might indicate, for example, that an adaptive access manager is to be called only if the authentication request originates from a mobile device. The authentication request itself can specify whether it originated from a mobile device. If the evaluation of the applicable policies indicates that an adaptive access manager should be called, then control passes to block 1220. Otherwise, control passes to block 1218.

In block 1218, the OAuth authorization server performs a standard authentication process relative to the specified user, without calling any adaptive access manager. Under such circumstances, the technique described with reference to FIG. 12 concludes.

Alternatively, in block 1220, the OAuth authorization server makes a call to an adaptive access manager that is located at the URL specified in the service profile that is mapped to the identity domain determined in block 1214. The call can include information pertaining to the authentication request, such as the identity of the user and the origin of the request (e.g., IP address, etc.). Based on such information, the called adaptive access manager can make a decision regarding whether some stronger form of authentication, beyond a simple password, should be required. For example, the stronger form of authentication might involve answering one or more challenge questions to which only the authentic user would know the answer, and/or supplying a one-time code sent out-of-band to a text message address known to belong to the authentic user. In block 1222, the OAuth authorization server receives, from the adaptive access manager called in block 1220, an indication at least of whether stronger authentication should be performed. In one embodiment, this indication may further indicate one or more kinds of stronger authentication, some of which are discussed in examples above, that should be performed. In block 1224, the OAuth authorization server determines, based on the adaptive access manager's response, whether to perform stronger authentication. If the adaptive access manager's response indicates that stronger authentication should be performed, then control passes to block 1226. Otherwise, control passes back to block 1218.

In block 1226, the OAuth authorization server attempts to authenticate the user using a an authentication process that is stronger than, or additional to, the standard authentication process. In one embodiment, this involves performing one or more types of stronger authentication specified by the adaptive access manager's response.

Using Representational State Transfer (Rest) for Consent Management

In a typical scenario, an application that is integrated with a website, such as a social media website or an e-mail website, might request, from a user, permission for the application to access personal information that the website maintains about the user, such as the user's contact list. The user can grant or deny this permission. The process by which an application asks for such permission is consent management. The permission, if granted, is consent. At the time that the application requests consent from the user, the website typically will authenticate the user.

Often, in the process of requesting consent, an application will use a Hypertext Transfer Protocol (HTTP)-based redirect operation in order to cause the user's browser to load a page from the website that possesses the user's information that the application seeks to access. Through such a page, the website will authenticate the user by requesting the user's identity and password. After authenticating the user, the website can disclose, to the user, the identity of the application, and the scope of the information (e.g., a contact list) that the application is seeking to access. The user can then tell the website whether the user gives consent for the application to access that information on the website. If the user gives consent, then the website can store that consent in association with the user's account. Later, the user can ask the website to show all of the consents that the user has given to various applications. The user can instruct the website to revoke selected consents if the user wishes. While an application has consent, the application can access the information to which the user has consented to access without requesting consent from that user again.

Under some circumstances, the interface through which an application needs to obtain a user's consent is not an Internet browser-based interface. Such an alternative type of interface might not be designed to use or understand HTTP, and, as such, might not comprehend or react appropriately to the HTTP redirects that are typically used as a part of consent management. For example, an application that is interacting with a user through a television interface might want to obtain the user's consent, but the television interface might not be designed to handle HTML redirects.

Therefore, in one embodiment of the invention, a mechanism is provided whereby consent can be managed regardless of whether the interface is Internet browser-based or not, and regardless of whether the interface is HTTP-compliant, or not. In one embodiment of the invention, an OAuth authorization server supports a RESTful interface for consent management. For example, in response to a user pressing a certain button on his television remote control, software executing on the user's television can invoke the RESTful interface of the server. Through the RESTful interface, the software can make a call back to the server and can save the consent provided through the pressing of the button. The same RESTful interface can also be used to revoke such consent later on. Using the RESTful interface, a client application can render a custom user interface that the client application can use to drive the consent management process. In an embodiment, no HTML-based redirects are involved in the REST-based consent management process. REST is described in greater detail in Fielding, Roy Thomas, *Architectural Styles and the Design of Network-based Software Architectures*, Doctoral dissertation, University of California, Irvine, 2000, which is incorporated by reference herein. REST is further discussed in U.S. Patent Application Publication No. 2013/0081128 and in U.S. Patent Application Publication No. 2013/0086669, each of which is also incorporated by reference herein.

Figure 13:
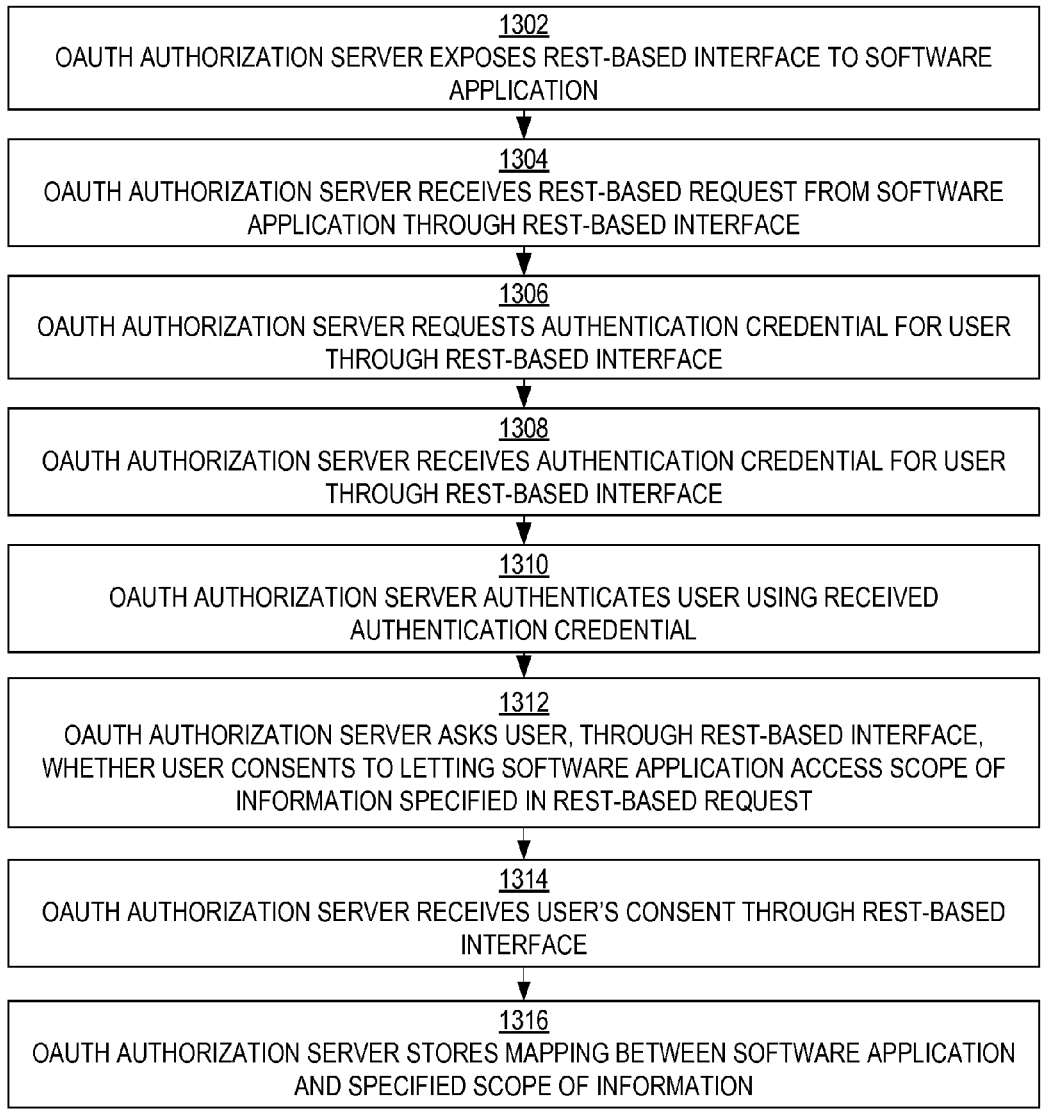
FIG. 13 is a flow diagram that illustrates an example of a technique whereby an OAuth authorization server provides a Representational State Transfer (REST) interface for consent management, according to an embodiment of the invention.

FIG. 13 is a flow diagram that illustrates an example of a technique whereby an OAuth authorization server provides a Representational State Transfer (REST) interface for consent management, according to an embodiment of the invention. In block 1302, an OAuth authorization server exposes a REST-based interface to a software application. In block 1304, the OAuth authorization server receives, from the software application, a REST-based request through the REST-based interface. The REST-based request can specify a scope of information that is associated with a specified user. In block 1306, in response to the REST-based request, the OAuth authorization server requests, from the software application, through the REST-based interface, an authentication credential (e.g., a password) associated with the specified user. In block 1308, the OAuth authorization server receives a credential from the software application through the REST-based interface. In block 1310, the OAuth authorization server authenticates the specified user based on the received credential. In block 1312, the OAuth authorization server asks the user, through the REST-based interface, whether the user consents to having the software application access information specified by the scope of information. In block 1314, the OAuth authorization server receives the user's consent through the REST-based interface. In block 1316, the OAuth authorization server stores a mapping between the software application and the scope of information. Thereafter, the software application can access information falling within the scope of information due to the stored mapping; the software application does not need to re-obtain the user's consent to access the information. In some embodiments, the user can interact with the OAuth authorization server through the REST-based interface to obtain a list of consents that the user has previously granted to various entities, along with the scopes of information involved in each consent. In some embodiment, the user can interface with the OAuth authorization server through the REST-based interface to revoke one or more previously granted consents. Such revocation can cause the OAuth authorization server to delete the mapping that pertains to the revoked consent.

Single Sign-on for Mobile Applications

In the cloud computing environment, multiple applications from the same vendor may be executing in the context of the same identity domain. When such an application is launched from a mobile device such as a smart phone, users may be bothered if they are required to provide a user identity and password to log into that application after they have already done so to log into another application from the same vendor. Mobile native applications have lacked a single sign-on mechanism. This differs from the Internet browser-based application paradigm, in which cookies stored by the browser can keep track of whether a user has logged into one website so that the user does not thereafter need to log into another related website.

According to an embodiment of the invention, a mechanism is provided whereby single sign-on functionality can be made available between mobile native applications. Using this mechanism, if a user logs into one mobile native application by supplying a user identity and password, then the fact that the user logged into that mobile native application can be used by other mobile native applications from the same vendor in order to allow the user to access those other mobile native applications without separately requiring the user to supply a user identity and password for each one. Essentially, the user can sign on to all of the mobile native applications in a group of applications that belong to a circle of trust by signing into any of those mobile native applications.

In order to enable such single sign-on functionality for mobile native applications, in one embodiment, a separate server-side store is created for each mobile device that can access the applications. Each of the mobile native applications is first registered on the server, which is remote from all of the mobile devices. The first time that a particular mobile native application is launched on a mobile device, a registration process is performed. Strong authentication, involving a second factor, may be performed as part of the registration process for each particular mobile native application. After each mobile native application in a trusted group has been registered with the server, authentication with any of those applications in the trusted group results in the creation of a user session that is shared between those applications, such that no password challenge is issued to the user if the user launches any of the other applications in the trusted group while the session is active. A circle of trust including all of the application in the group is maintained on the server.

In one embodiment, a separate device store is created on the server for each mobile device. The user session initiated from a particular mobile device is stored within the device store for that mobile device. The server issues a client registration token to each application within the trusted group that registers with the server. The client registration token include three items of information: the hardware identifier of the mobile device (e.g., Media Access Control (MAC) address) from which the application was launched, the identity of the user on whose behalf the token has been issued, and the identity of the application to which the token has been issued. Each of the applications in the trusted group receives the client registration token, which contains the same hardware identifier. The application identity differs between the tokens possessed by the applications within the trusted group. The hardware identifier within the client registration token has been signed (e.g., using encryption techniques) by the server.

Prior to the creation of the user session, when the first mobile native application in the trusted group launches, that application provides the client registration token to the OAuth authorization server. The OAuth authorization server authenticates the first mobile native application using a password challenge and then stores a user session in the server-side device store associated with the mobile device specified by the client registration token. The user session can have a specified expiration time. When another mobile native application in the same trusted group launches, that application also provides the client registration token to the OAuth authorization server. Using the hardware identifier in the client registration token, the device store associated with the mobile device can be unlocked. The server can determine that it was the signer of the hardware identifier in the token. The server can determine that the device store associated with the mobile device having the hardware identifier already contains a valid user session. In response to making this determination, the OAuth authorization server notifies the mobile native application that no password challenge needs to be issued to the user; the user can use all of the mobile native applications in the trusted group without any additional sign-on process, due to the existence of the valid user session in the device store.

In one embodiment of the invention, a single identity domain can contain multiple separate service profiles. For example, a first service profile can be established for a first group of applications, and a second service profile can be established for a second group of applications. In an embodiment, all applications that are associated with a particular service profile are placed within the same trusted group. Single sign-on functionality is available for applications within the same trusted group. A tenant who administers an identity domain can specify, for each service profile in its identity domain, the applications that are associated with that service profile. Separate service profiles can be created per department or employee role, for example.

Figure 14:
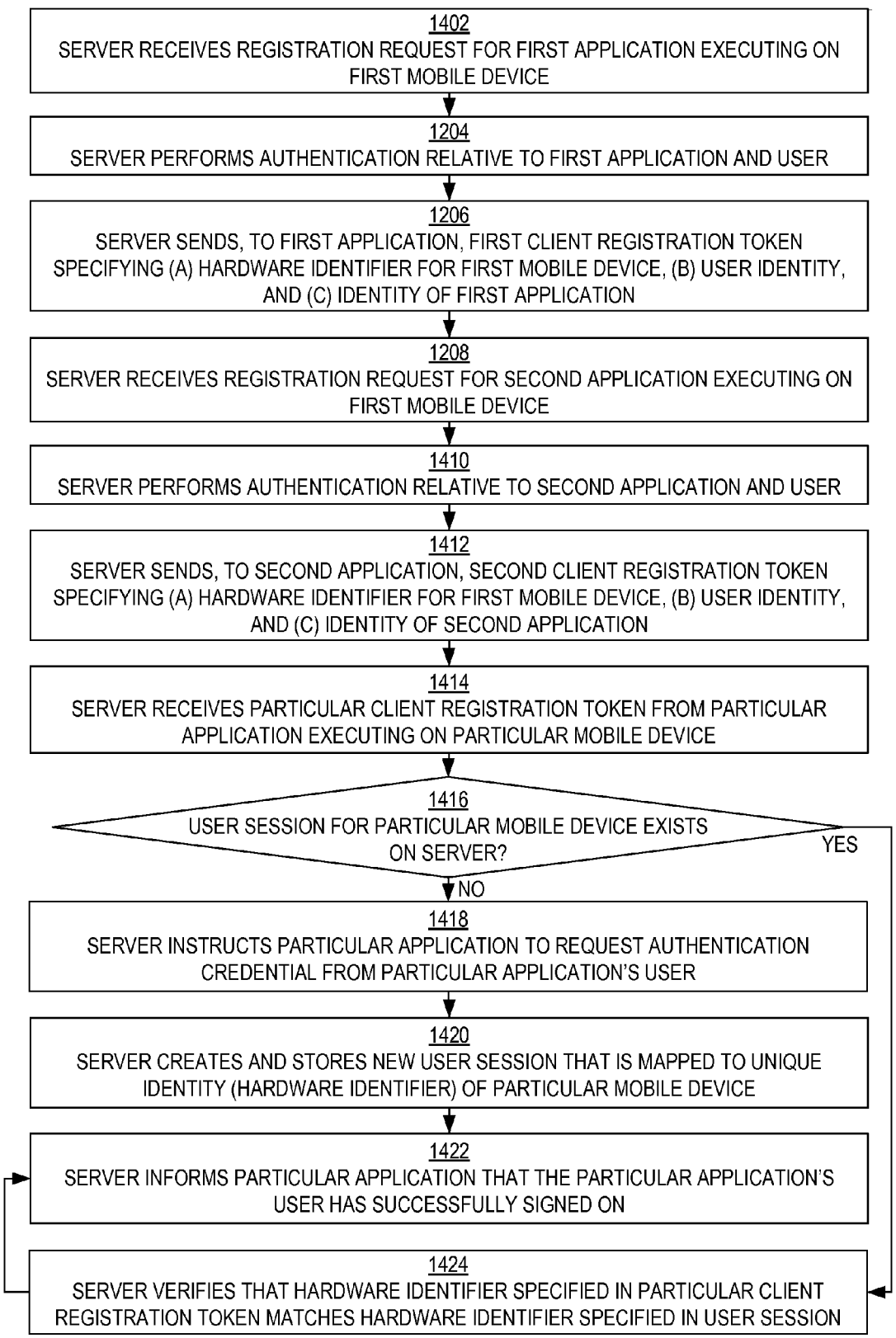
FIG. 14 is a flow diagram that illustrates an example of a technique whereby a server maintains an active user session for multiple interrelated applications that execute on a mobile device separate from the server, according to an embodiment of the invention.

FIG. 14 is a flow diagram that illustrates an example of a technique whereby a server maintains an active user session for multiple interrelated applications that execute on a mobile device separate from the server, according to an embodiment of the invention. In block 1402, a server (potentially an OAuth authorization server) receives a registration request from a first application executing on a first mobile device. In block 1404, the server performs an authentication process relative to the first application and its user. In block 1406, the server sends, to the first application, a first client registration token that specifies (a) a hardware identifier of the first mobile device, (b) a user identity of the user that was authenticated, and (c) an identity of the first application. The first application stores the first client registration token.

In block 1408, the server receives a registration request from a second application executing on the first mobile device. The second application is separate from the first application, but may belong to a circle-of-trust group to which the first application also belongs. Each application is that circle-of-trust group may be a product of the same vendor, for example. In block 1410, the server performs an authentication process relative to the second application and its user. In block 1412, the server sends, to the second application, a second client registration token that specifies (a) the same hardware identifier of the first mobile device, (b) the same user identity of the user that was authenticated, and (c) an identity of the second application, which differs from the identity of the first application. The second application stores the second client registration token. The server can also receive registration requests from applications executing on other mobile devices, such as a second mobile device. The client registration tokens that the server sends to such applications would each specify the hardware identifiers of the respective mobile devices on which those applications executed.

In block 1414, the server receives a particular client registration token from a particular application executing on a particular mobile device. For example, the particular mobile device might be the first mobile device, a second mobile device separate from the first mobile device, or some other mobile device. Furthermore, the particular application might be the first application executing on the first mobile device, the second application executing on the first mobile device, some other application executing on the first mobile device, or some other application executing on some mobile device other than the first mobile device. In block 1416, the server determines whether a user session for the particular mobile device exists at the server. If a user session for the particular mobile device exists, then control passes to block 1424. Otherwise, control passes to block 1418.

In block 1418, the server instructs the particular application to request an authentication credential from a user of the particular application. For example, the server can instruct the particular application to challenge the user of the particular application to supply a password known to the server to be associated with the user. In block 1420, after verifying that the user-supplied authentication credential is legitimate, the server creates and stores a new user session that is mapped to a unique identity of the particular mobile device. In an embodiment, this unique identity is the hardware identifier that is specified in the particular client registration token that the server received in block 1414.

In block 1422, the server informs the particular application that the user of the particular application has successfully signed on to the particular application. Thereafter, the user of the particular application can access the functionality provided by the particular application for as long as the user remains signed on. In an embodiment, the user remains signed on for as long as the user session stored at the server remains valid.

Alternatively, in block 1424, the server verifies that the hardware identifier specified in the particular client registration token matches the hardware identifier specified in the user session. As is discussed above, the hardware identifier sent in each client registration token and the hardware identifier specified in the user session all can be signed by the server using encryption techniques, so that the hardware identifier cannot be forged. After the server verifies that the hardware identifiers match, control passes to block 1422. Under such circumstances, the server does not instruct the particular application to request an authentication credential as in block 1418; the user of the particular mobile device has already signed on previously, as evidenced by the existence of the server-side user session for that particular mobile device. Thus, in this manner, the server can provide single sign-on functionality for applications executing on mobile devices.

Mobile OAuth Service

The single sign-on technique for mobile applications discussed above works securely enough assuming that the OAuth authorization server only provides client registration tokens to legitimate mobile applications on the mobile device at the time that those application register for the first time with the server. As part of enforcing security, strong authentication—potentially involving a second factor—may be performed for each mobile application at registration time to ensure that only legitimate applications receive client registration tokens. However, some hacking techniques still possibly may undermine even these safeguards. An application on a mobile device hypothetically could masquerade as some other application.

Therefore, in one embodiment of the invention, in order to confirm that an application on a mobile device actually is the application that is claims to be, an out-of-band verification mechanism is provided. On Apple iOS, a mechanism called APNS—Apple Push Notification Service—is provided. APNS can be used to uniquely identify an application on a mobile device. External sources that wish to communicate with mobile applications can send push notifications through APNS to those mobile applications on mobile devices. The APNS server guarantees that such notifications will be sent to the specific applications on the specific devices for which those notifications are destined. This guarantee is based on certificates that Apple has issued to each mobile device. At the time that an application registers for the APNS, that application presents the mobile device's certificate to Apple's APNS server. The APNS server returns a device token to the application. The APNS server stores an association between the device token and the application and the mobile device on which the application executes. The application can present the device token to external sources that desire to send notifications to the application. These external sources can present the device token to the APNS server along with each notification that the external sources seek to send to the application. The APNS server then can push each such notification to the application that is associated with that device token.

Thus, on at least some mobile devices, APNS can be used as a mechanism to send a message to an application on a device in a secure manner. APNS can be used as the out-of-band mechanism for registering an application with the OAuth authorization server. The OAuth authorization server can send the client registration token to the mobile application over APNS at the time that the mobile application initially registers with the OAuth authorization server, thereby ensuring that only the proper mobile application will receive that client registration token. A masquerading client will not be known to the APNS, and therefore will not receive a client registration token pushed through APNS from the OAuth authorization server. In one embodiment, during the mobile application registration process, the mobile application provides the device token received from APNS to the OAuth authorization server, and thereafter the OAuth authorization server uses that device token to push information to that mobile application whenever the OAuth authorization server communicates information to that mobile application.

In an alternative embodiment of the invention, the OAuth authorization server does not send the entire client registration token to the mobile application over APNS. Instead, the OAuth authorization server splits the client registration token into two encrypted parts. The OAuth authorization server sends half of the client registration token over APNS to the mobile application. The OAuth authorization server sends the other half of the client registration token to the mobile application using a Hypertext Transfer Protocol (HTTP) channel—typically the same channel that the mobile application used to register with the OAuth authorization server. After receiving both halves and combining them, the mobile application has a complete client registration token. This technique can be even more secure than sending the entire client registration through APNS.

Some mobile devices do not execute Apple iOS and are unable to use APNS. In one embodiment of the invention, at least some mobile devices, such as devices that execute the Android operating system, receive client registration tokens using a similar technique as that described above except with Google Cloud Messaging (GCM) being used as the out-of-band token transmission channel instead of APNS.

Figure 15:
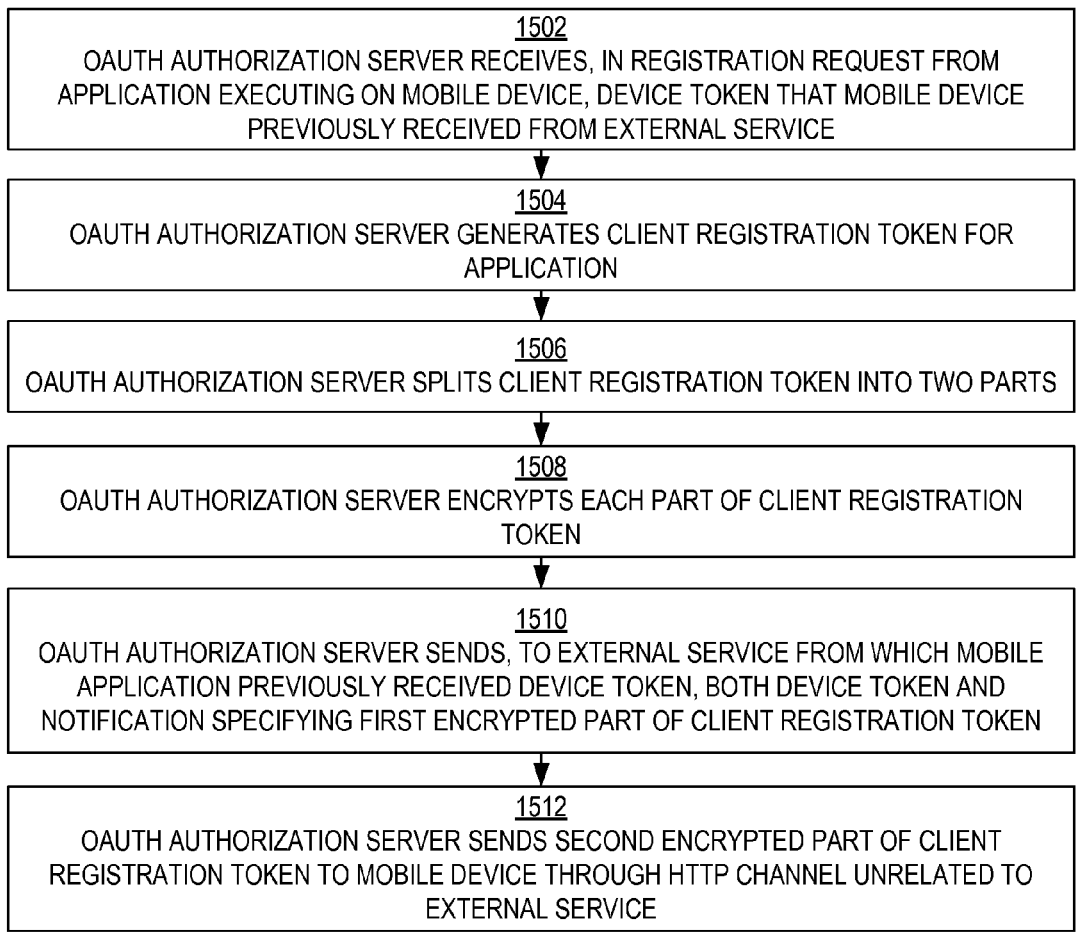
FIG. 15 is a flow diagram that illustrates an example of a technique for securely sending a client registration token to a mobile device through out-of-band channels so that the mobile device can subsequently use that client registration token to achieve single sign-on functionality, according to an embodiment of the invention.

FIG. 15 is a flow diagram that illustrates an example of a technique for securely sending a client registration token to a mobile device through out-of-band channels so that the mobile device can subsequently use that client registration token to achieve single sign-on functionality, according to an embodiment of the invention. In block 1502, an OAuth authorization server receives, in a registration request from an application that executes on a mobile device, a device token that uniquely identifies the application and that the application previously received from a service as part of a prior registration process in which the application engaged with the service. The service is separate from, and not provided or controlled by, the OAuth authorization server or the shared cloud computing environment in which the OAuth authorization server executes. In one embodiment, the service is Apple Push Notification Service (APNS). In another embodiment, the service is Google Cloud Messaging (GCM). In other embodiments, the service can be some other notification or messaging service that provides, to applications, device tokens that uniquely identify those applications. Such services often are connected with application stores from which mobile devices can download applications. Such application stores typically assign such unique application identifiers to such applications as a part of the process of making such applications available within those application stores.

In block 1504, the OAuth authorization server generates a client registration token in response to the application's registration request. As is discussed above in connection with FIG. 14, such a client registration token in one embodiment specifies, among other information, a MAC address of the mobile device on which the application executes. In block 1506, the OAuth authorization server splits the client registration token into two parts. Each such part contains information that the other part does not. In block 1508, the OAuth authorization server encrypts each part of the client registration token.

In block 1510, the OAuth authorization server sends, to the service from which the mobile application previously received the device token, both the device token and a notification that specifies a first encrypted part of the client registration token. The service subsequently can verify the authenticity of the device token and push the notification, including the first encrypted part of the client registration token, to the application on the mobile device. Both the application and the mobile device are uniquely identified by the device token. The device token can specify the MAC address of the mobile device, which the service can use to address the push notification in a network.

In block 1512, the OAuth authorization server sends a second encrypted part of the client registration token to the mobile device through a Hypertext Transfer Protocol (HTTP) channel that is not related to the service used to send the first encrypted part. In one embodiment, this HTTP channel is the same channel through which the mobile device sent the registration request that the OAuth authorization server received in block 1502. The mobile device subsequently can receive both encrypted parts of the client registration token, decrypt each part, and combine the decrypted parts into the complete client registration token. Thereafter, the mobile device can store the client registration token and use the client registration token as described above in connection with FIG. 14 to achieve single sign-on functionality for interrelated applications that execute on that mobile device.

Hardware Overview

Figure 16:
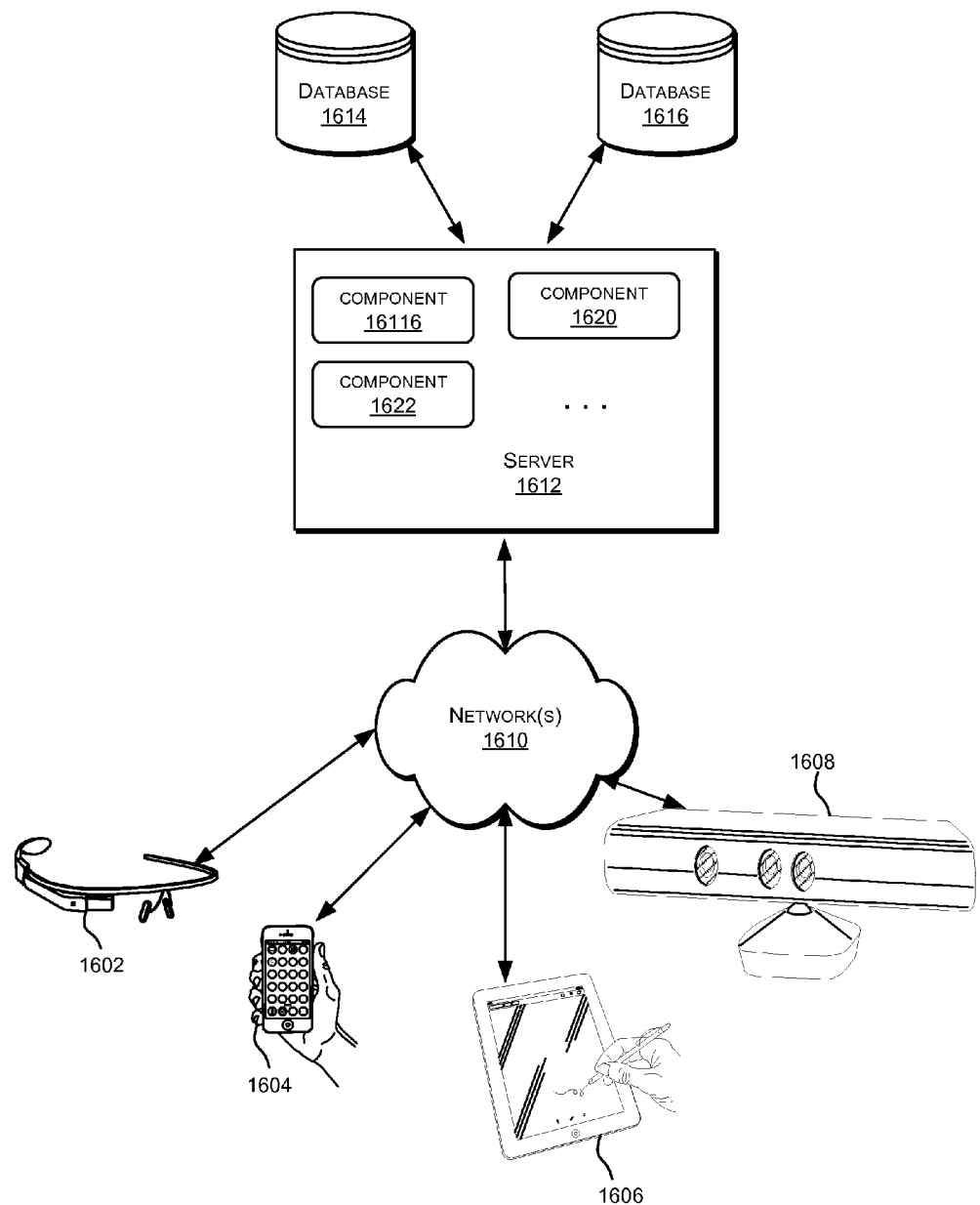
FIG. 16 depicts a simplified diagram of a distributed system for implementing one of the embodiments.

FIG. 16 depicts a simplified diagram of a distributed system 1600 for implementing one of the embodiments. In the illustrated embodiment, distributed system 1600 includes one or more client computing devices 1602, 1604, 1606, and 1608, which are configured to execute and operate a client application such as a web browser, proprietary client (e.g., Oracle Forms), or the like over one or more network(s) 1610. Server 1612 may be communicatively coupled with remote client computing devices 1602, 1604, 1606, and 1608 via network 1610.

In various embodiments, server 1612 may be adapted to run one or more services or software applications provided by one or more of the components of the system. In some embodiments, these services may be offered as web-based or cloud services or under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in the figure, the software components 1618, 1620 and 1622 of system 1600 are shown as being implemented on server 1612. In other embodiments, one or more of the components of system 1600 and/or the services provided by these components may also be implemented by one or more of the client computing devices 1602, 1604, 1606, and/or 1608. Users operating the client computing devices may then utilize one or more client applications to use the services provided by these components. These components may be implemented in hardware, firmware, software, or combinations thereof. It should be appreciated that various different system configurations are possible, which may be different from distributed system 1600. The embodiment shown in the figure is thus one example of a distributed system for implementing an embodiment system and is not intended to be limiting.

Client computing devices 1602, 1604, 1606, and/or 1608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 17, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1602, 1604, 1606, and 1608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1610.

Although exemplary distributed system 1600 is shown with four client computing devices, any number of client computing devices may be supported. Other devices, such as devices with sensors, etc., may interact with server 1612.

Network(s) 1610 in distributed system 1600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1610 can be a local area network (LAN), such as one based on Ethernet, Token-Ring and/or the like. Network(s) 1610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 1602.11 suite of protocols, Bluetooth®, and/or any other wireless protocol); and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1612 may be adapted to run one or more services or software applications described in the foregoing disclosure. For example, server 1612 may correspond to a server for performing processing described above according to an embodiment of the present disclosure.

Server 1612 may run an operating system including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more databases 1614 and 1616. Databases 1614 and 1616 may reside in a variety of locations. By way of example, one or more of databases 1614 and 1616 may reside on a non-transitory storage medium local to (and/or resident in) server 1612. Alternatively, databases 1614 and 1616 may be remote from server 1612 and in communication with server 1612 via a network-based or dedicated connection. In one set of embodiments, databases 1614 and 1616 may reside in a storage-area network (SAN). Similarly, any necessary files for performing the functions attributed to server 1612 may be stored locally on server 1612 and/or remotely, as appropriate. In one set of embodiments, databases 1614 and 1616 may include relational databases, such as databases provided by Oracle, which are adapted to store, update, and retrieve data in response to SQL-formatted commands.

Figure 17:
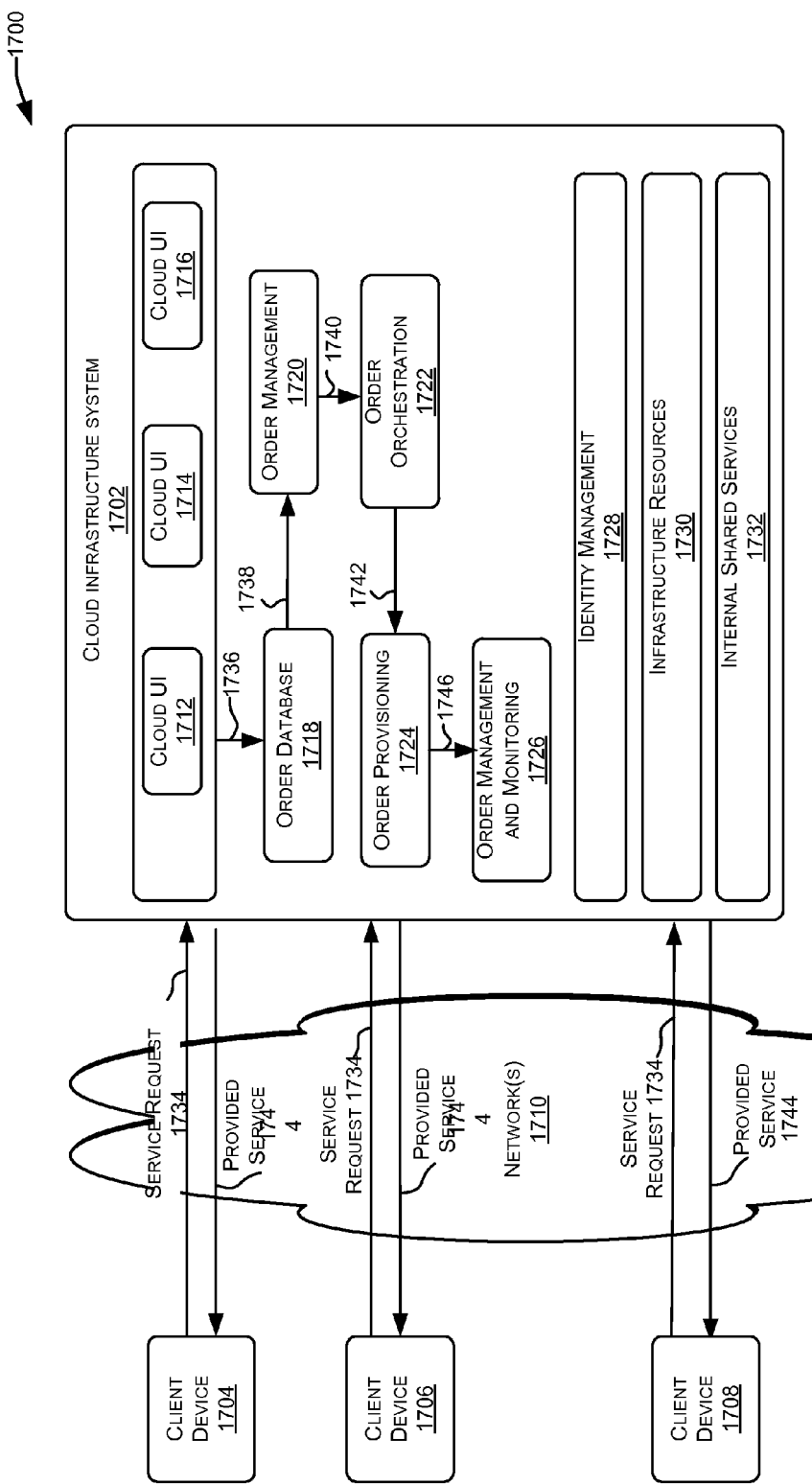
FIG. 17 is a simplified block diagram of components of a system environment by which services provided by the components of an embodiment system may be offered as cloud services, in accordance with an embodiment of the present disclosure.

FIG. 17 is a simplified block diagram of one or more components of a system environment 1700 by which services provided by one or more components of an embodiment system may be offered as cloud services, in accordance with an embodiment of the present disclosure. In the illustrated embodiment, system environment 1700 includes one or more client computing devices 1704, 1706, and 1708 that may be used by users to interact with a cloud infrastructure system 1702 that provides cloud services. The client computing devices may be configured to operate a client application such as a web browser, a proprietary client application (e.g., Oracle Forms), or some other application, which may be used by a user of the client computing device to interact with cloud infrastructure system 1702 to use services provided by cloud infrastructure system 1702.

It should be appreciated that cloud infrastructure system 1702 depicted in the figure may have other components than those depicted. Further, the embodiment shown in the figure is only one example of a cloud infrastructure system that may incorporate an embodiment of the invention. In some other embodiments, cloud infrastructure system 1702 may have more or fewer components than shown in the figure, may combine two or more components, or may have a different configuration or arrangement of components.

Client computing devices 1704, 1706, and 1708 may be devices similar to those described above for 1602, 1604, 1606, and 1608.

Although exemplary system environment 1700 is shown with three client computing devices, any number of client computing devices may be supported. Other devices such as devices with sensors, etc. may interact with cloud infrastructure system 1702.

Network(s) 1710 may facilitate communications and exchange of data between clients 1704, 1706, and 1708 and cloud infrastructure system 1702. Each network may be any type of network familiar to those skilled in the art that can support data communications using any of a variety of commercially-available protocols, including those described above for network(s) 1610.

Cloud infrastructure system 1702 may comprise one or more computers and/or servers that may include those described above for server 1612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1702 may be adapted to automatically provision, manage and track a customer's subscription to services offered by cloud infrastructure system 1702. Cloud infrastructure system 1702 may provide the cloud services via different deployment models. For example, services may be provided under a public cloud model in which cloud infrastructure system 1702 is owned by an organization selling cloud services (e.g., owned by Oracle) and the services are made available to the general public or different industry enterprises. As another example, services may be provided under a private cloud model in which cloud infrastructure system 1702 is operated solely for a single organization and may provide services for one or more entities within the organization. The cloud services may also be provided under a community cloud model in which cloud infrastructure system 1702 and the services provided by cloud infrastructure system 1702 are shared by several organizations in a related community. The cloud services may also be provided under a hybrid cloud model, which is a combination of two or more different models.

In some embodiments, the services provided by cloud infrastructure system 1702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1702. Cloud infrastructure system 1702 then performs processing to provide the services in the customer's subscription order.

In some embodiments, the services provided by cloud infrastructure system 1702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1702 may also include infrastructure resources 1730 for providing the resources used to provide various services to customers of the cloud infrastructure system. In one embodiment, infrastructure resources 1730 may include pre-integrated and optimized combinations of hardware, such as servers, storage, and networking resources to execute the services provided by the PaaS platform and the SaaS platform.

In some embodiments, resources in cloud infrastructure system 1702 may be shared by multiple users and dynamically re-allocated per demand. Additionally, resources may be allocated to users in different time zones. For example, cloud infrastructure system 1730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1732 may be provided that are shared by different components or modules of cloud infrastructure system 1702 and by the services provided by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1702, and the like.

In one embodiment, as depicted in the figure, cloud management functionality may be provided by one or more modules, such as an order management module 1720, an order orchestration module 1722, an order provisioning module 1724, an order management and monitoring module 1726, and an identity management module 1728. These modules may include or be provided using one or more computers and/or servers, which may be general purpose computers, specialized server computers, server farms, server clusters, or any other appropriate arrangement and/or combination.

In exemplary operation 1734, a customer using a client device, such as client device 1704, 1706 or 1708, may interact with cloud infrastructure system 1702 by requesting one or more services provided by cloud infrastructure system 1702 and placing an order for a subscription for one or more services offered by cloud infrastructure system 1702. In certain embodiments, the customer may access a cloud User Interface (UI), cloud UI 1712, cloud UI 1714 and/or cloud UI 1716 and place a subscription order via these UIs. The order information received by cloud infrastructure system 1702 in response to the customer placing an order may include information identifying the customer and one or more services offered by the cloud infrastructure system 1702 that the customer intends to subscribe to.

After an order has been placed by the customer, the order information is received via the cloud UIs, 1712, 1714 and/or 1716.

At operation 1736, the order is stored in order database 1718. Order database 1718 can be one of several databases operated by cloud infrastructure system 1718 and operated in conjunction with other system elements.

At operation 1738, the order information is forwarded to an order management module 1720. In some instances, order management module 1720 may be configured to perform billing and accounting functions related to the order, such as verifying the order, and upon verification, booking the order.

At operation 1740, information regarding the order is communicated to an order orchestration module 1722. Order orchestration module 1722 may utilize the order information to orchestrate the provisioning of services and resources for the order placed by the customer. In some instances, order orchestration module 1722 may orchestrate the provisioning of resources to support the subscribed services using the services of order provisioning module 1724.

In certain embodiments, order orchestration module 1722 enables the management of business processes associated with each order and applies business logic to determine whether an order should proceed to provisioning. At operation 1742, upon receiving an order for a new subscription, order orchestration module 1722 sends a request to order provisioning module 1724 to allocate resources and configure those resources needed to fulfill the subscription order. Order provisioning module 1724 enables the allocation of resources for the services ordered by the customer. Order provisioning module 1724 provides a level of abstraction between the cloud services provided by cloud infrastructure system 1700 and the physical implementation layer that is used to provision the resources for providing the requested services. Order orchestration module 1722 may thus be isolated from implementation details, such as whether or not services and resources are actually provisioned on the fly or pre-provisioned and only allocated/assigned upon request.

At operation 1744, once the services and resources are provisioned, a notification of the provided service may be sent to customers on client devices 1704, 1706 and/or 1708 by order provisioning module 1724 of cloud infrastructure system 1702.

At operation 1746, the customer's subscription order may be managed and tracked by an order management and monitoring module 1726. In some instances, order management and monitoring module 1726 may be configured to collect usage statistics for the services in the subscription order, such as the amount of storage used, the amount data transferred, the number of users, and the amount of system up time and system down time.

In certain embodiments, cloud infrastructure system 1700 may include an identity management module 1728. Identity management module 1728 may be configured to provide identity services, such as access management and authorization services in cloud infrastructure system 1700. In some embodiments, identity management module 1728 may control information about customers who wish to utilize the services provided by cloud infrastructure system 1702. Such information can include information that authenticates the identities of such customers and information that describes which actions those customers are authorized to perform relative to various system resources (e.g., files, directories, applications, communication ports, memory segments, etc.) Identity management module 1728 may also include the management of descriptive information about each customer and about how and by whom that descriptive information can be accessed and modified.

Figure 18:
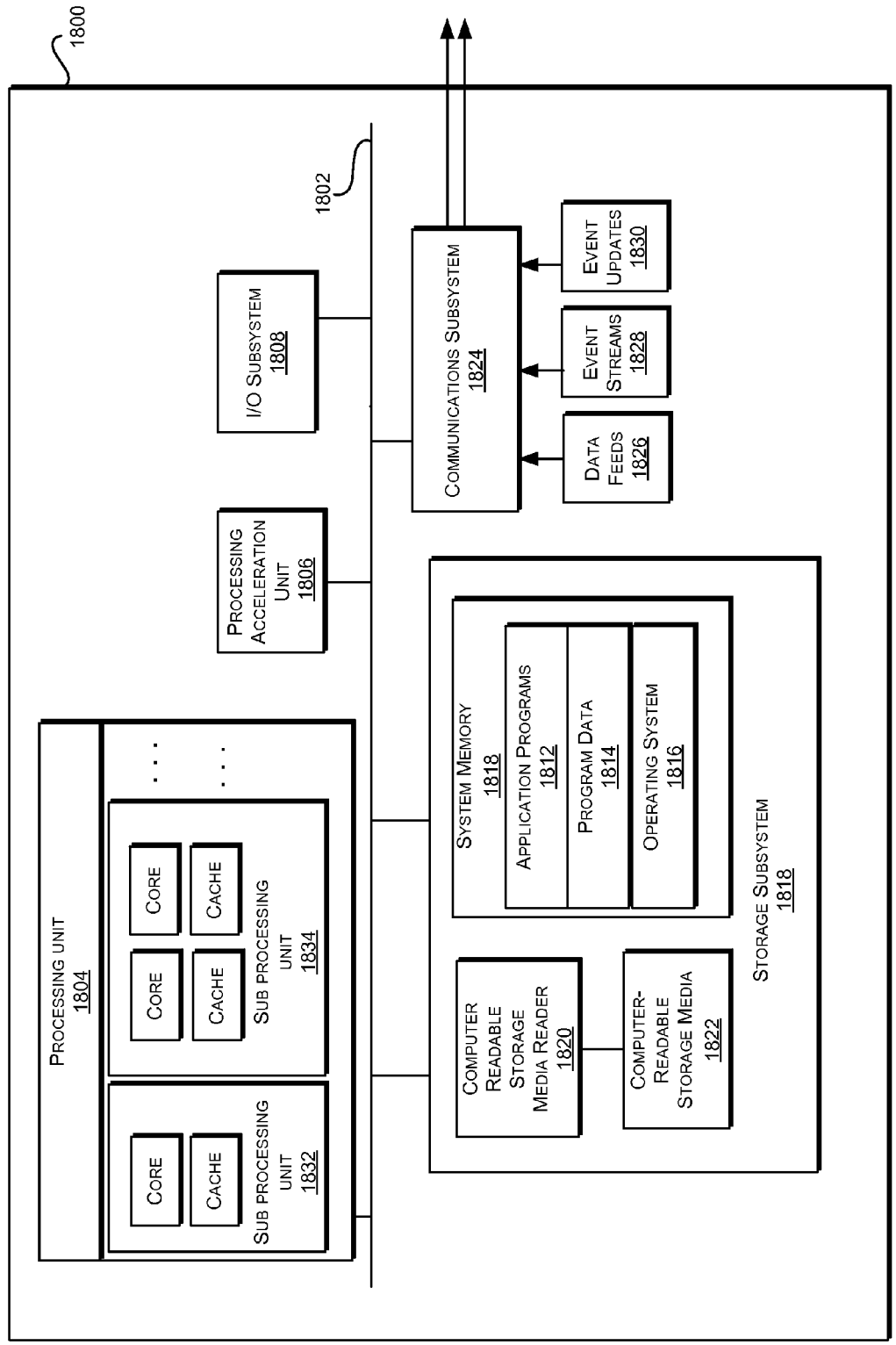
FIG. 18 illustrates an example of a computer system in which various embodiments of the present invention may be implemented.

FIG. 18 illustrates an example computer system 1800 in which various embodiments of the present invention may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that comprises software elements, shown as being currently located within a system memory 1810. System memory 1810 may store program instructions that are loadable and executable on processing unit 1804, as well as data generated during the execution of these programs.

Depending on the configuration and type of computer system 1800, system memory 1810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 may include multiple different types of memory, such as static random access memory (SRAM) or dynamic random access memory (DRAM). In some implementations, a basic input/output system (BIOS), containing the basic routines that help to transfer information between elements within computer system 1800, such as during start-up, may typically be stored in the ROM. By way of example, and not limitation, system memory 1810 also illustrates application programs 1812, which may include client applications, Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 18 OS, and Palm® OS operating systems.

Storage subsystem 1818 may also provide a tangible computer-readable storage medium for storing the basic programming and data constructs that provide the functionality of some embodiments. Software (programs, code modules, instructions) that when executed by a processor provide the functionality described above may be stored in storage subsystem 1818. These software modules or instructions may be executed by processing unit 1804. Storage subsystem 1818 may also provide a repository for storing data used in accordance with the present invention.

Storage subsystem 1800 may also include a computer-readable storage media reader 1820 that can further be connected to computer-readable storage media 1822. Together and, optionally, in combination with system memory 1810, computer-readable storage media 1822 may comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1602.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
storing a first mapping between a first authorization policy and a first identity domain;
receiving, at an authorization server computer, a first token request from a first client application that is associated with the first identity domain, the first token request for accessing a service provided by a resource server computer;
in response to receiving the first token request, identifying, based on the first mapping, the first authorization policy for facilitating the first client application to access the service provided by the resource server computer;
determining, based on the first authorization policy, a first scope of access information for the first client application to access the service provided by the resource server computer, wherein the first scope of access information indicates a first operation permitted by the first client application while accessing the service, and the first scope of access information indicates a second operation not permitted by the first client application while accessing the service provided by the resource server computer, and wherein determining the first scope of access information based on the first authorization policy comprises determining whether the resource server computer provides the first scope of access information;

generating a first token that includes the first scope of access information; and sending, from the authorization sever computer to the first client application, the first token.

2. The computer-implemented method of claim 1, wherein determining the first scope of access information based on the first authorization policy comprises:

in response to determining that the resource server computer provides the first scope of access information, requesting, by the authorization server, the first scope of access information from the resource server computer;

determining, at the resource server, based on the first mapping, that the first identity domain is mapped to the first authorization policy;

in response to identifying, based on the first mapping, the first authorization policy, applying, at the resource server computer, the first authorization policy to attributes of the first client application to produce the first scope of access information; and sending the first scope of access information from the resource server computer to the authorization server computer in response to said requesting.

3. The computer-implemented method of claim 1, further comprising:

storing a second mapping between a second authorization policy and a second identity domain;

receiving, at the authorization server computer, a second token request from a second client application contained in the second identity domain, the second token request for accessing the service provided by the resource server computer;

in response to receiving the second token request, the authorization server computer requesting a second scope of access information from the resource server computer;

determining, at the resource server computer, based on the second mapping, that the second identity domain is mapped to the second authorization policy;

in response to determining based on the second mapping that the second identity domain is mapped to the second authorization policy, applying, at the resource server computer, the second authorization policy to attributes of the second client application to produce the second scope of access information;

sending the second scope of access information from the resource server computer to the authorization server computer in response to said requesting;

generating, at the authorization server computer, a second token that includes the second scope of access information; and sending, from the authorization server computer to the second client application, the second token;

wherein the second authorization policy differs from the first authorization policy.

4. The computer-implemented method of claim 1, further comprising:

receiving, at the authorization server computer, a second token request from a second client application contained in the first identity domain;

in response to receiving the second token request, the authorization server requesting second scope of access information from the resource server computer;

determining, at the resource server computer, based on the first mapping, that the first identity domain is mapped to the first authorization policy;

in response to determining based on the first mapping that the first identity domain is mapped to the first authorization policy, applying, at the resource server computer, the first authorization policy to attributes of the second client application to produce the second scope of access information;

sending the second scope of access information from the resource server computer to the authorization server computer in response to said requesting;

generating at the authorization server computer, a second token that includes the second scope of access information; and sending, from the authorization server computer to the second client application, the second token that specifies the second scope of access information;

wherein the second client application is separate from the first client application; and wherein the second scope of access information differs from the first scope of access information.

5. The computer-implemented method of claim 1, further comprising:

receiving, at the authorization server computer, a configuration that specifies a set of user attributes;

storing the configuration at the authorization server computer;

retrieving, from a user identity repository, in response to the first token request, values of the user attributes that are specified in the configuration; and inserting the values of the user attributes into the first token prior to sending the first token to the first client application.

6. The computer-implemented method of claim 1, further comprising:

receiving, at the authorization server computer, a first uniform resource locator (URL) for a first plug-in that is designed to access a user identity repository of a first type;

storing, at the authorization server computer, a second mapping between a first client application type and the first URL;

receiving, at the authorization server computer, a second uniform resource locator (URL) for a second plug-in that is designed to access a user repository of a second type that differs from the first type;

storing, at the authorization server computer, a third mapping between a second client application type and the second URL;

receiving, at the authorization server computer, an authentication request from a particular client application of a particular client application type;

in response to receiving the authentication request, selecting, from among the first URL and the second URL, a particular URL that is mapped, in either the second mapping or the third mapping, to the particular client application type; and forwarding the authentication request from the authorization server computer to a particular plug-in that is located at the particular URL.

7. A computer-readable memory comprising instructions which, when executed by one or more processors, cause the one or more processors to perform operations comprising:

storing a first mapping between a first authorization policy and a first identity domain;

at an authorization server computer, receiving, from a first client application, a first token request, the first client application that is associated with the first identity domain, the first token request for accessing a service provided by a resource server computer;

in response to receiving the first token request, identifying, based on the first mapping, that the first authorization policy for facilitating the first client application to access the service provided by the resource server computer;

determining, based on the first authorization policy, a first scope of access information for the first client application to access the service provided by the resource server computer, wherein the first scope of access information indicates a first operation permitted by the first client application while accessing the service, and the first scope of access information indicates a second operation not permitted by the first client application while accessing the service provided by the resource server computer, and wherein determining the first scope of access information based on the first authorization policy comprises determining whether the resource server computer provides the first scope of access information;

generating a first token that includes the first scope of access information; and sending, from the authorization server to the first client application, the first token that includes the first scope of access information.

8. The computer-readable memory of claim 7, wherein determining the first scope of access information based on the first authorization policy comprise:

in response to determining that the resource server computer provides the first scope of access information, requesting, by the authorization server computer, the first scope of access information from the resource server;

determining, at the resource server computer, based on the first mapping, that the first identity domain is mapped to the first authorization policy;

in response to identifying, based on the first mapping, the first authorization policy, applying, at the resource server computer, the first authorization policy to attributes of the first client application to produce the first scope of access information; and sending the first scope of access information from the resource server to the authorization server computer in response to said requesting.

9. The computer-readable memory of claim 7, wherein the instructions, when executed by the one or more processors, cause the one or more processors to perform operations comprising:

storing a second mapping between a second authorization policy and a second identity domain;

receiving, at the authorization server computer, a second token request from a second client application that is associated with the second identity domain, the second token request for accessing the service provided by a resource server computer;

in response to receiving the second token request, the authorization server computer requesting second scope of access information from the resource server computer;

determining, at the resource server computer, based on the second mapping, that the second identity domain is mapped to the second authorization policy;

in response to determining based on the second mapping that the second identity domain is mapped to the second authorization policy, applying, at the resource server computer, the second authorization policy to attributes of the second client application to produce the second scope of access information;

sending the second scope of access information from the resource server computer to the authorization server computer in response to said requesting;

generating, at the authorization server computer, a second token that includes the second scope of access information; and sending, from the authorization server computer to the second client application, a second token;

wherein the second authorization policy differs from the first authorization policy.

10. The computer-readable memory of claim 7, wherein the instructions, when executed by the one or more processors, cause the one or more processors to perform operations comprising:

receiving, at the authorization server computer, a second token request from a second client application that is associated with the first identity domain;

in response to receiving the second token request, the authorization server computer requesting second scope of access information from the resource server computer;

determining, at the resource server computer, based on the first mapping, that the first identity domain is mapped to the first authorization policy;

in response to determining based on the first mapping that the first identity domain is mapped to the first authorization policy, applying, at the resource server, the first authorization policy to attributes of the second client application to produce the second scope of access information;

sending the second scope of access information from the resource server computer to the authorization server computer in response to said requesting;

generating at the authorization server computer, a second token that includes the second scope of access information; and sending, from the authorization server computer to the second client application, the second token that includes the second scope of access information;

wherein the second client application is separate from the first client application; and wherein the second scope of access information differs from the first scope of access information.

11. The computer-readable memory of claim 7, wherein the instructions, when executed by the one or more processors, cause the one or more processors to perform operations comprising:

receiving, at the authorization server computer, a configuration that specifies a set of user attributes;

storing the configuration at the authorization server computer;

retrieving, from a user identity repository, in response to the first token request, values of the user attributes that are specified in the configuration; and inserting the values of the user attributes into the first token prior to sending the first token to the first client application.

12. The computer-readable memory of claim 7, wherein the instructions, when executed by the one or more processors, cause the one or more processors to perform operations comprising:
receiving, at the authorization server computer, a first uniform resource locator (URL) for a first plug-in that is designed to access a user identity repository of a first type;
storing, at the authorization server computer, a second mapping between a first client application type and the first URL;
receiving, at the authorization server computer, a second uniform resource locator (URL) for a second plug-in that is designed to access a user repository of a second type that differs from the first type;
storing, at the authorization server computer, a third mapping between a second client application type and the second URL;
receiving, at the authorization server computer, an authentication request from a particular client application of a particular client application type;
in response to receiving the authentication request, selecting, from among the first URL and the second URL, a particular URL that is mapped, in either the second mapping or the third mapping, to the particular client application type; and
forwarding the authentication request from the authorization server computer to a particular plug-in that is located at the particular URL.

13. A system comprising:
a first machine comprising a processor configured to enable a resource server computer that is configured to store a first mapping between a first authorization policy and a first identity domain of a plurality of identity domains;
a second machine comprising a processor configured to enable a first client application that is associated with the first identity domain; and
a third machine comprising a processor configured to enable an authorization server computer that is configured to:
receive a first token request from the first client application;
identify, in response to receiving the first token request, and based on the first mapping, that the first authorization policy for facilitating the first client application to access a service provided by the resource server computer;
determine, based on the first authorization policy, first scope of access information for the first client application to access the service provided by the resource server computer, wherein the first scope of access information indicates a first operation permitted by the first client application while accessing the service, and the first scope of access information indicates a second operation not permitted by the first client application while accessing the service provided by the resource server computer, and wherein determining the first scope of access information based on the first authorization policy comprises determining whether the resource server computer provides the first scope of access information;
generate a first token that includes the first scope of access information; and
send, to the first client application, the first token.

14. The system of claim 13, wherein, to determine the first scope of access information determined based on the first authorization policy, the authorization server computer is configured to request the first scope of access information from the resource server computer, and the resource server computer is configured to:
identify, based on the first mapping, the first authorization policy;
apply, in response to identifying the first authorization policy, the first authorization policy to attributes of the first client application to produce the first scope of access information; and
send the first scope of access information to the authorization server computer.

15. The system of claim 13, wherein the system comprises a fourth machine comprising a processor configured to enable a second client application that is associated with a second identity domain of the plurality of identity domains; wherein the authorization server computer is configured to receive a second token request from the second client application and to request, in response to receiving the second token request, second scope of access information from the resource server computer; and wherein the resource server computer is configured to:
store a second mapping between a second authorization policy and the second identity domain;
determine, based on the second mapping, that the second identity domain is mapped to the second authorization policy;
apply, in response to determining based on the second mapping that the second identity domain is mapped to the second authorization policy, the second authorization policy to attributes of the second client application to produce the second scope of access information; and
send the second scope of access information to the authorization server computer;
wherein the second authorization policy differs from the first authorization policy.

16. The system of claim 13, wherein the system comprises a fourth machine comprising a processor configured to enable a second client application that is associated with the first identity domain; wherein the authorization server computer is configured to receive a second token request from the second client application and to request, in response to receiving the second token request, second scope of access information from the resource server computer; and wherein the resource server computer is configured to:
determine, based on the first mapping, that the first identity domain is mapped to the first authorization policy;
apply, in response to determining based on the first mapping that the first identity domain is mapped to the first authorization policy, the first authorization policy to attributes of the second client application to produce the second scope of access information; and
send the second scope of access information to the authorization server computer;
wherein the second client application is separate from the first client application; and
wherein the second scope of access information differs from the first scope of access information.

17. The system of claim 13, wherein the authorization server computer is configured to:
receive a configuration that specifies a set of user attributes;
store the configuration;
retrieve, from a user identity repository, in response to the first token request, values of the user attributes that are specified in the configuration; and insert the values of the user attributes into the first token prior to sending the first token to the first client application.

18. The system of claim 13, wherein the system comprises a fourth machine comprising a processor configured to enable a first plug-in that is designed to access a user identity repository of a first type; wherein the system comprises a fifth machine comprising a processor configured to enable a second plug-in that is designed to access the user identity repository of a second type that differs from the first type; and wherein the authorization server is configured to:
- receive a first uniform resource locator (URL) for the first plug-in;
- store a second mapping between a first type of client application and the first URL;
- receive a second uniform resource locator (URL) for the second plug-in;
- store a third mapping between a second type of client application and the second URL;
- receive an authentication request from a particular client application of a particular type;
- select, in response to receiving the authentication request, and from among the first URL and the second URL, a particular URL that is mapped, in either the second mapping or the third mapping, to the particular type; and
- forward the authentication request from the authorization server to a particular plug-in that is located at the particular URL.

19. The method of claim 1, wherein identifying the first authorization policy includes:
- requesting, at the authorization server computer, the resource server computer to identify an authorization policy for the first client application, wherein the first authorization policy is stored at the resource server computer; and
- receiving the first authorization policy from the resource server computer in response to the requesting.

20. The method of claim 1, further comprising:
- receiving, at the authorization server computer, a second token request from a second client application that is associated with the first identity domain for accessing the service provided by the resource server computer;
- in response to receiving the second token request, identifying, based on a second mapping between a second authorization policy and the first identity domain, the first authorization policy for facilitating the second client application to access the service provided by the resource server computer;
- determining, based on the second authorization policy, a second scope of access information for the second client application to access the service provided by the resource server computer, wherein the second scope of access information indicates a third operation permitted by the second client application while accessing the service provided by the resource server computer, indicates a fourth operation not permitted by the second client application while accessing the service provided by the resource server computer, and wherein the second scope of access information is distinct from the first scope of access information;
- generating, at the authorization server computer, a second token that includes second scope of access information; and
- sending, from the authorization server computer to the second client application the second token.

* * * * *

UNITED STATES PATENT AND TRADEMARK OFFICE
CERTIFICATE OF CORRECTION

PATENT NO. : 9,544,294 B2
APPLICATION NO. : 14/266515
DATED : January 10, 2017
INVENTOR(S) : Uppili Srinivasan et al.

It is certified that error appears in the above-identified patent and that said Letters Patent is hereby corrected as shown below:

On the Title Page

Item (56) References Cited, Other Publications

Column 2, Line 1, Delete "Shwaye Gelagay" and insert -- Shewaye Gelagay --, therefor.

At Page 2, Column 2, Line 26, delete ".letf." and insert -- .ietf. --, therefor.

In the Drawings

Sheet 15 of 19 (Fig. 14), Line 4, delete "1204" and insert -- 1404 --, therefor.

Sheet 15 of 19 (Fig. 14), Line 6, delete "1206" and insert -- 1406 --, therefor.

Sheet 15 of 19 (Fig. 14), Line 10, delete "1208" and insert -- 1408 --, therefor.

In the Specification

In Column 1, Line 51, after "thinking" insert -- . --.

In Column 8, Line 3, delete "AuthZ" and insert -- Oauth --, therefor.

In Column 29, Line 24, delete "a an" and insert -- an --, therefor.

In Column 36, Line 30, delete "1618" and insert -- 16116 --, therefor.

In the Claims

In Column 47, Line 10, In Claim 1, delete "sever" and insert -- server --, therefor.

Signed and Sealed this
Twentieth Day of March, 2018

Andrei Iancu
*Director of the United States Patent and Trademark Office*

CERTIFICATE OF CORRECTION (continued)
U.S. Pat. No. 9,544,294 B2

In Column 47, Line 17, In Claim 2, delete "server," and insert -- server computer, --, therefor.

In Column 47, Line 20, In Claim 2, delete "server," and insert -- server computer, --, therefor.

In Column 47, Lines 36-37, In Claim 3, delete "contained in the second identity domain," and insert -- that is associated with the second identity domain, --, therefor.

In Column 47, Lines 65-66, In Claim 4, delete "contained in the first identity domain;" and insert -- that is associated with the first identity domain; --, therefor.

In Column 48, Lines 20-21, In Claim 4, delete "specifies" and insert -- includes --, therefor.

In Column 49, Line 35, In Claim 8, delete "comprise:" and insert -- comprises: --, therefor.